(12) United States Patent
Sasaki

(10) Patent No.: US 8,422,042 B2
(45) Date of Patent: *Apr. 16, 2013

(54) TERMINAL DEVICE

(75) Inventor: Hiroyuki Sasaki, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,409

(22) Filed: Apr. 13, 2012

(65) Prior Publication Data

US 2012/0200878 A1    Aug. 9, 2012

Related U.S. Application Data

(63) Continuation of application No. 11/837,240, filed on Aug. 10, 2007.

(30) Foreign Application Priority Data

Aug. 11, 2006 (JP) ................. 2006-220188
Aug. 11, 2006 (JP) ................. 2006-220189
Mar. 30, 2007 (JP) ................. 2007-091910

(51) Int. Cl.
*G06F 3/12* (2006.01)
*G06K 15/00* (2006.01)
*G06F 15/16* (2006.01)
*G06F 13/20* (2006.01)
*G06F 13/00* (2006.01)

(52) U.S. Cl.
USPC ....... 358/1.13; 358/1.15; 358/1.16; 358/1.17; 709/230; 710/313; 710/316

(58) Field of Classification Search .......... None
See application file for complete search history.

(56) References Cited

U.S. PATENT DOCUMENTS 5,101,199 A    3/1992  Suzuki
6,078,583 A    6/2000  Takahara et al.
(Continued)

FOREIGN PATENT DOCUMENTS

JP    2004-32098      1/2004
JP    2004-312711    11/2004
(Continued)

OTHER PUBLICATIONS

U. S. Office Action dated Nov. 11, 2011 in parent case, namely U.S. Appl. No. 11/837,240.

(Continued)

*Primary Examiner* — Satwant Singh
(74) *Attorney, Agent, or Firm* — Scully, Scott, Murphy & Presser PC

(57) ABSTRACT

A communication device has a process unit, a network interface, a communication interface, an interface control unit, a device control unit, and a relay unit. The network interface communicates with a terminal device connected to a network. The communication interface communicates with a locally connected peripheral device. The interface control unit controls the communication interface and transmits control data to the peripheral device, the control data being for controlling the peripheral device. The device control unit generates the control data for the peripheral device in accordance with an instruction entered from the processing unit, and transmits the control data to the interface control unit. The relay unit extracts the control data for the peripheral device from a packet received by the network interface, and transmits the control data to the interface control unit.

8 Claims, 26 Drawing Sheets

U.S. PATENT DOCUMENTS

| | | | | |
|---|---|---|---|---|
| 8,314,945 | B2 * | 11/2012 | Sasaki | 358/1.13 |
| 2004/0255263 | A1 | 12/2004 | Ando | |
| 2006/0056401 | A1 | 3/2006 | Bohm et al. | |
| 2006/0565401 | | 3/2006 | Bohm et al. | |
| 2006/0123129 | A1 * | 6/2006 | Toebes et al. | 709/230 |
| 2007/0245058 | A1 * | 10/2007 | Wurzburg et al. | 710/313 |
| 2008/0005432 | A1 | 1/2008 | Kagawa | |
| 2012/0094682 | A1 * | 4/2012 | Ode et al. | 455/452.1 |

FOREIGN PATENT DOCUMENTS

| | | |
|---|---|---|
| JP | 2005-110086 | 4/2005 |
| JP | 2005-348125 | 12/2005 |
| JP | 2006-37930 | 2/2006 |
| JP | 2006-85637 | 3/2006 |
| JP | 2006-86642 | 3/2006 |
| JP | 2006-178398 | 6/2006 |
| JP | 2007-219711 | 8/2007 |
| JP | 2008-9629 | 1/2008 |

OTHER PUBLICATIONS

"Silex Technology"; URL: http://www.silex.jp/japan/products/network/usb/sx2000us.html) Aug. 3, 2006.

Extended European Search Report dated Mar. 20, 2008.

Japanese Official Action dated Jul. 15, 2008.

Japanese Official Action dated Dec. 16, 2008.

Examiner's Opinion dated May 11, 2010 received from Japanese Patent Office.

Japanese Official Action dated Aug. 31, 2010.

Japanese Official Action dated Jul. 12, 2011 in related case JP 2007-091910.

Notice of Allowance dated Aug. 2, 2012 received in related U.S. Appl. No. 11/837,240.

* cited by examiner

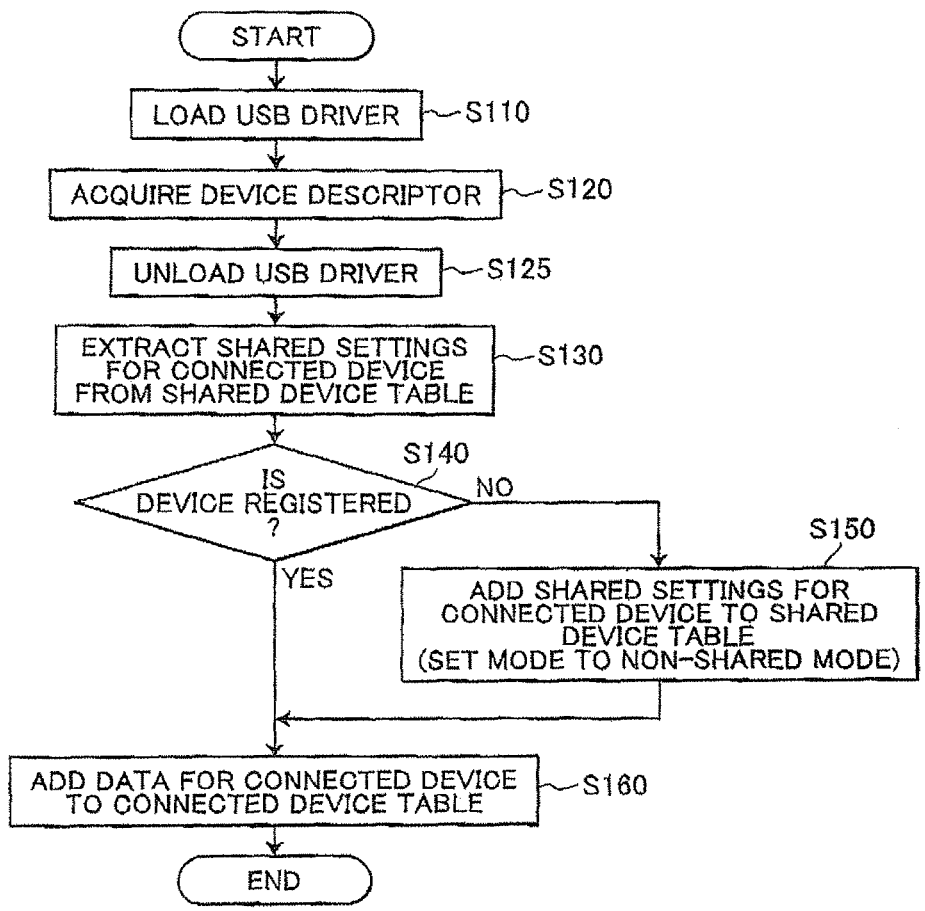

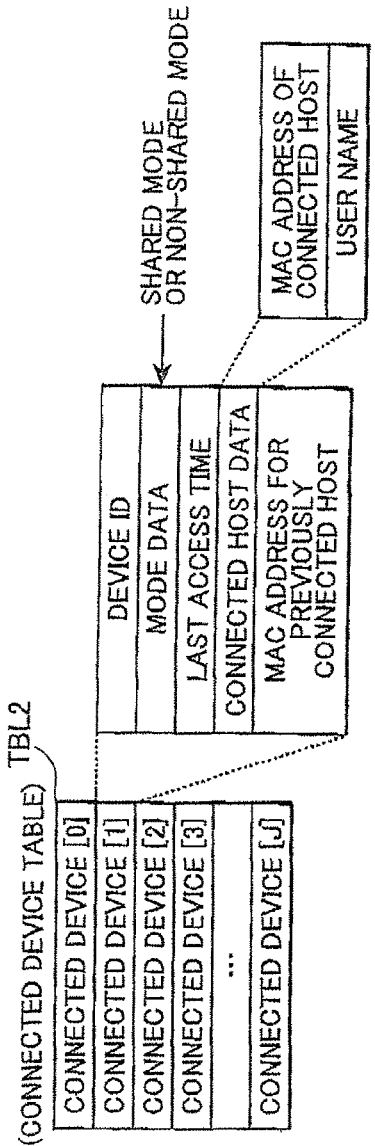

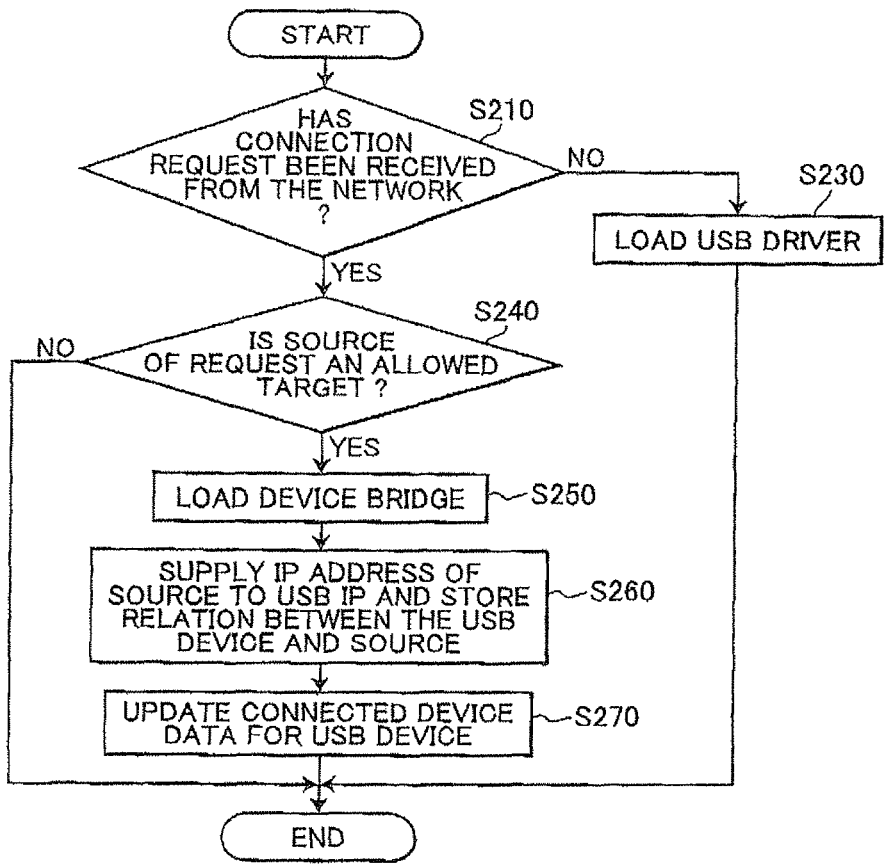
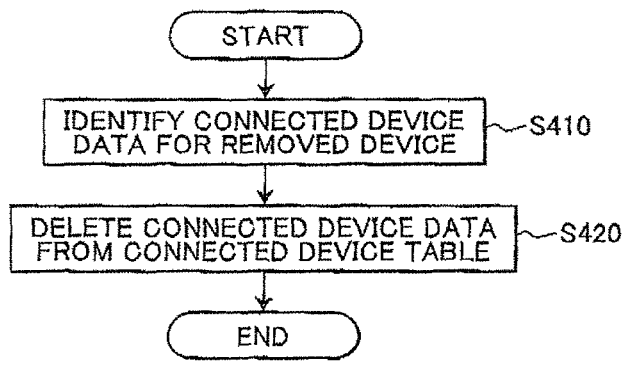

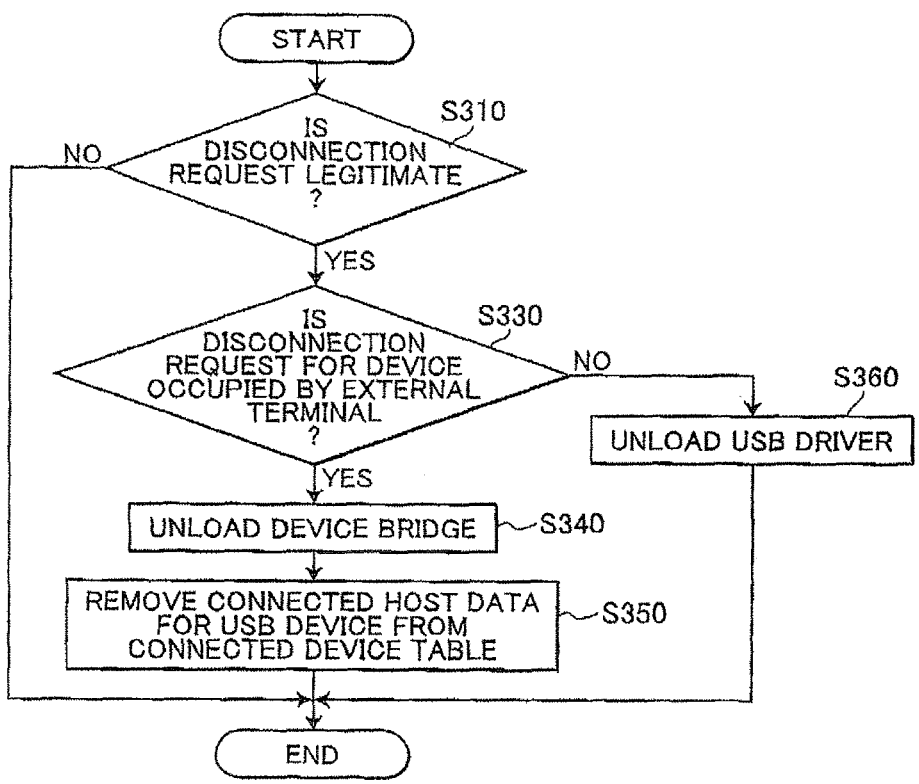

(CONNECTION SETTINGS WINDOW)

(DETAILED SETTINGS WINDOW)

START → IDENTIFY CONNECTED DEVICE DATA FOR ACCESSED USB DEVICE (S10) → UPDATE LAST ACCESS TIME IN CONNECTED DEVICE DATA TO THE CURRENT TIME (S20) → END

[CONTENT UPDATE DATA TABLE] TBL3

| INDEX | DEVICE ID | RSS URL | LAST UPDATE TIME | NEXT UPDATE TIME |
|---|---|---|---|---|
| 0 | * | http://*/*.xml | * | *** |
| 1 | * | http://*/*.xml | * | *** |
| 2 | * | http://*/*.xml | * | *** |
| ... | ... | ... | ... | ... |
| M | * | http://*/*.xml | * | *** |

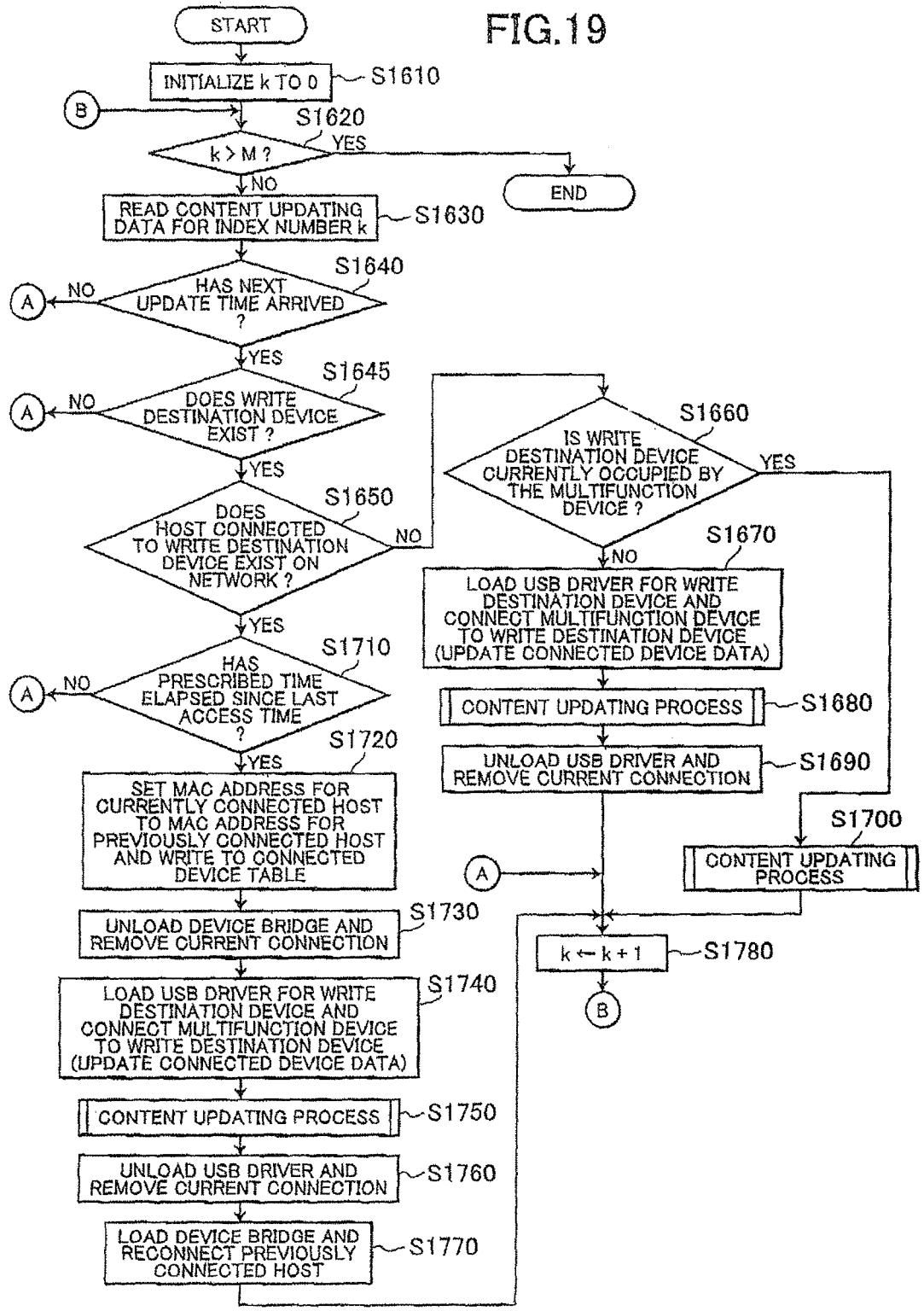

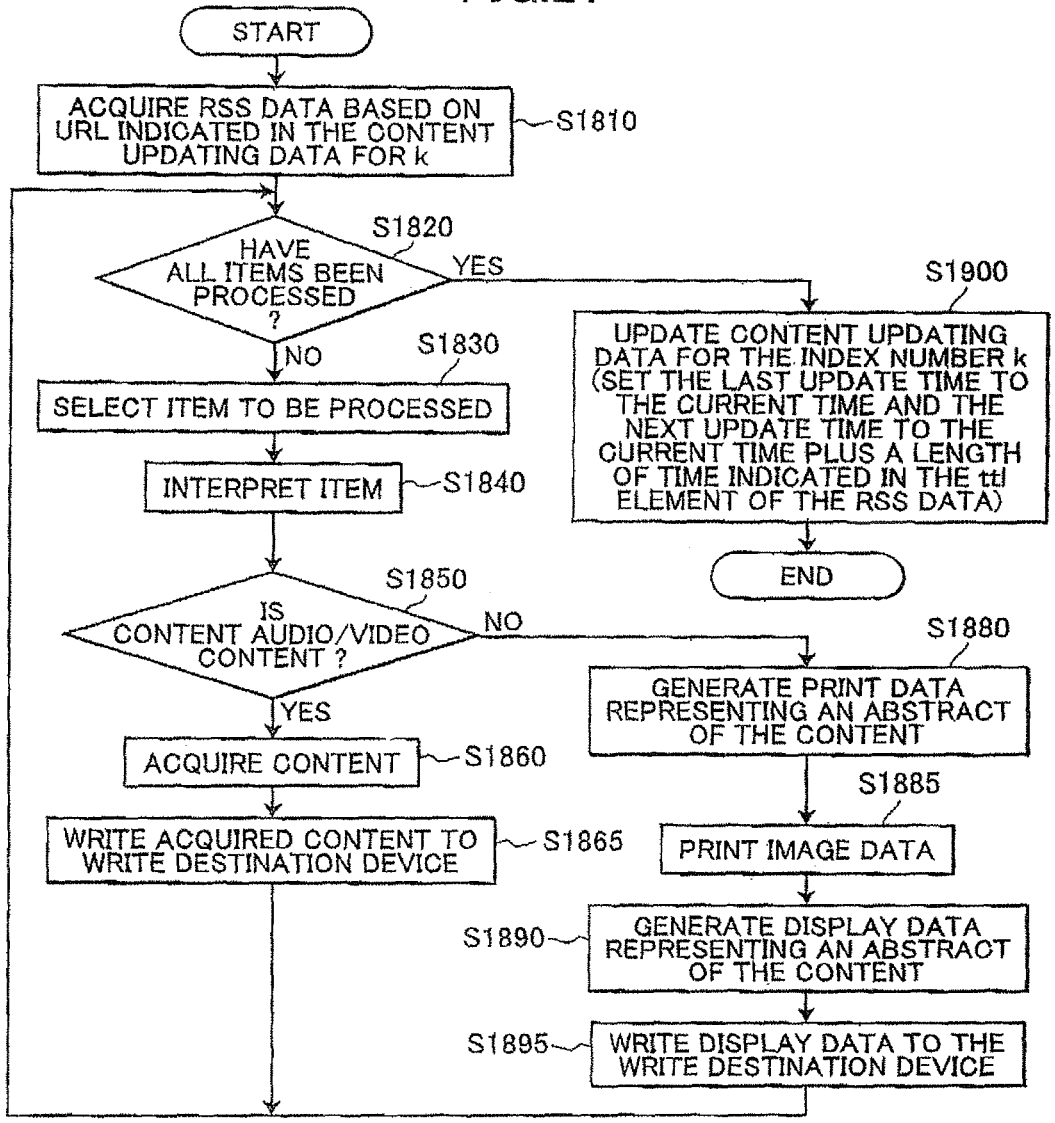

FIG.22

```
<?xml version="10" encoding="utf-8"?>
<rss version="20">
  <channel>
    <title>英語ニュース</title>
    <link>http://www.*********</link>
    <description>英語のニュースを365日毎日配信</description>
    <language>ja-jp</language>
    <copyright>Copyright (c) 2000-2006, *********</copyright>
    <pubDate>Mon. 26 Jun 2006 08:00:00 +0900</pubDate>
    <ttl>1440</ttl>
    <item>
      <title>英語ニュース2006年6月24日</title>
      <description>世界のニュースを英語で毎日配信</description>
      <enclosure url="http://www.*********/20060623.mp3" length="15468277" type="audio/mpeg"/>
      <category>News</category>
    </item>
    <item>
    ...............
    </item>
    :
    :
  </channel>
</rss>
```

FIG.23

```
<?xml version="10" encoding="utf-8"?>
<rss version="20">
  <channel>
    <title>ITニュースアップデート</title>
    <link>http://www.*********</link>
    <description>IT関連製品の速報サイト</description>
    <language>ja-jp</language>
    <copyright>Copyright (c) 2000-2006, ************</copyright>
    <pubDate>*************</pubDate>
    <ttl>480</ttl>
    <item>
      <title>○○○株式会社、ネットワーク製品xxxxを発表</title>
      <link>http://www.*********/news/200606/24/newproduct0.html</link>
<description>○○○株式会社はネットワーク製品xxxx1234の発売日を発表した。
発売日は2006年7月3日。xxxx1300はこれまでのxxxx1200のセキュリティ管理機
能を強化し、同時に煩雑になりがちなセキュリティ設定を簡易にした……
      </description>
      <category>NewProduct</category>
    </item>
    <item>
    ..................
    </item>
    :
    :
  </channel>
</rss>
```

【ITニュースアップデート】
IT関連製品の速報サイト
Copyright (c) 2000-2006, ************
Mon, 26 Jun 2006 08:00:00 +0900

【○○○株式会社、ネットワーク製品xxxxを発表】
○○○株式会社はネットワーク製品xxxx1234の発売日を発表した。発売日は
2006年7月3日。xxxx1300はこれまでのxxxx1200のセキュリティ管理機能を強化
し、同時に煩雑になりがちなセキュリティ設定を簡易にした……

FIG.27A

[CONTENT UPDATING DATA TABLE IN MUSIC PLAYER]

| RSS URL | LAST UPDATE TIME | NEXT UPDATE TIME |
|---|---|---|
| http://*/*.xml | * | * |
| http://*/*.xml | * | * |
| ... | ... | ... |
| http://*/*.xml | * | * |

TBL4

FIG.27B

[CONTENT UPDATING DATA TABLE IN RAM]

| INDEX | DEVICE ID | RSS URL | LAST UPDATE TIME | NEXT UPDATE TIME | TABLE ACQUISITION SOURCE |
|---|---|---|---|---|---|
| 0 | * | http://*/*.xml | * | *** | −1 |
| 1 | * | http://*/*.xml | * | *** | −1 |
| 2 | −1 | http://*/*.xml | * | * | −1 |
| ... | ... | ... | ... | ... | ... |
| M | * | http://*/*.xml | * | *** | −1 |
| M+1 | 0 | http://*/*.xml | * | * | 0 |
| M+2 | 0 | http://*/*.xml | * | * | 0 |
| ... | ... | ... | ... | ... | ... |
| M+A1 | 0 | http://*/*.xml | * | * | 0 |
| M+A1+1 | 1 | http://*/*.xml | * | * | 1 |
| M+A1+2 | 1 | http://*/*.xml | * | * | 1 |
| ... | ... | ... | ... | ... | ... |
| Ms | 1 | http://*/*.xml | * | * | 1 |

TBL5

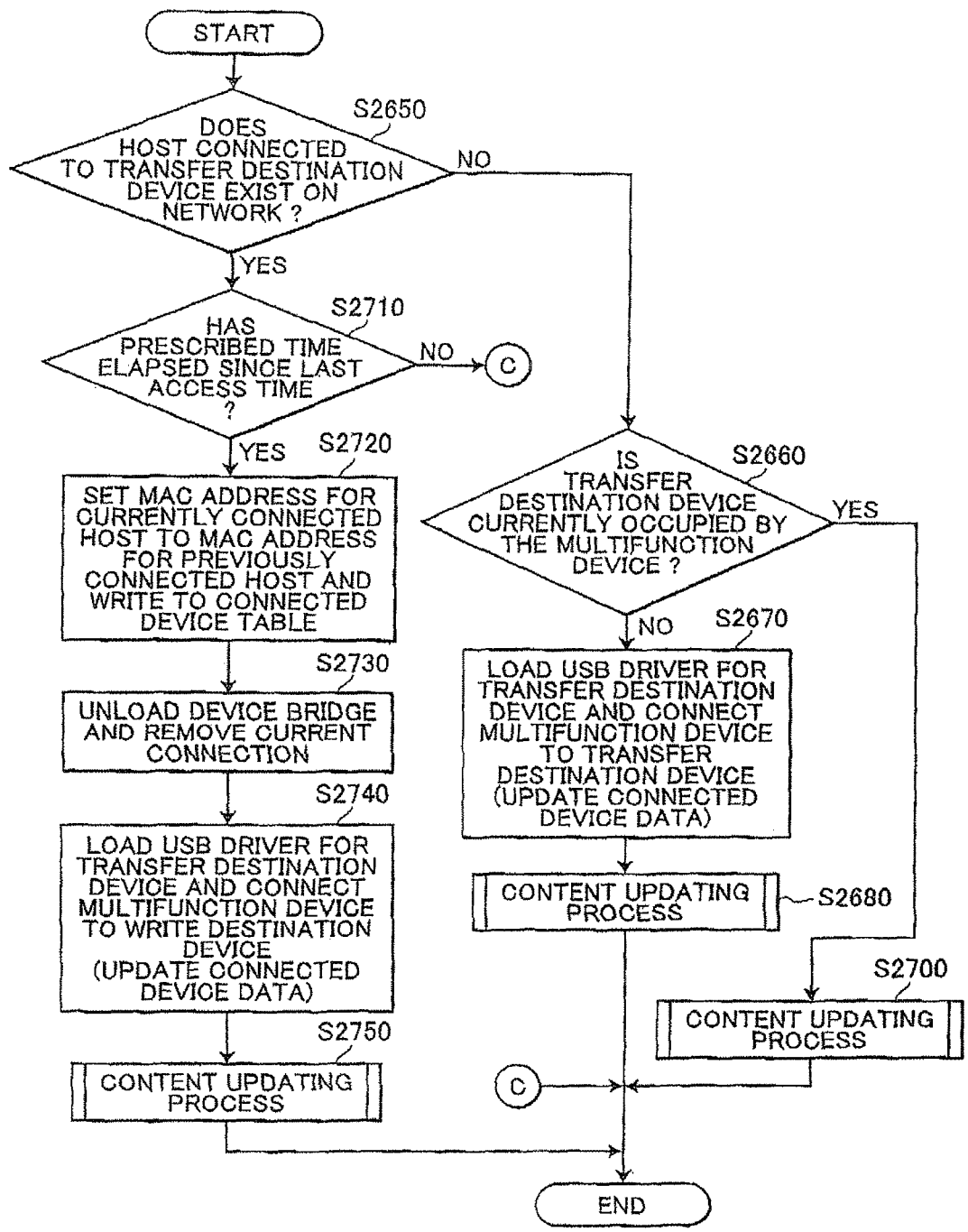

TERMINAL DEVICE

CROSS REFERENCE TO RELATED APPLICATION

This application is a continuation application of U.S. application Ser. No. 11/837,240 filed Aug. 10, 2007 which claims priority from Japanese Patent Applications No. 2006-220188 filed on Aug. 11, 2006, No. 2006-220189 filed on Aug. 11, 2006, and No. 2007-091910 filed on Mar. 30, 2007. The entire content of each is incorporated herein by reference.

TECHNICAL FIELD

The present invention relates to a communication device including a network interface for connecting to a network, and particularly to a terminal device including a local interface for connecting to a peripheral device.

BACKGROUND

Communication devices having a network interface for connecting to a device through a network and a local interface for connecting with a peripheral device are well known in the art. For example, Japanese patent application publication No. 2005-110086 discloses a digital color multifunction device having a local area network (LAN) interface and a universal serial bus (USB) interface.

Conventional techniques for controlling a peripheral device connected to the communication device include a technique for controlling the peripheral device based on a command received directly from a main processing unit (an application program) in the communication device, and another technique for controlling the peripheral device through a network by another device connected to the network (see Japanese Web site "Silex Technology"; URL: http://www.silex.jp/japan/products/network/usb/sx2000us.html).

One technology designed for controlling the peripheral device over the network is the USB over IP (registered trademark) technology. The USB over IP technology controls the peripheral device through an IP network by another device connected to the IP network by encapsulating USB data to be transmitted to the peripheral device in IP packets and transmitting the packets to the communication device connected to the peripheral device via the IP network.

SUMMARY

However, the conventional technology for controlling the peripheral device locally connected to the communication device via the network, as in the USB over IP (registered trademark) technology, has been problematic when simply applied to a communication device such as a digital multifunction device, as follows.

One such conventional communication device functions as a dedicated relay device provided between the peripheral device and the network. This conventional communication device receives an IP packet transmitted via the network and addressed to the peripheral device, and transfers data from the IP packet to the peripheral device. The conventional communication device also generates an IP packet from data generated from the peripheral device and transmits the IP packet over the network. However, when this conventional communication device is incorporated into a digital multifunction device, the multifunction device can access the peripheral device connected to the communication device only via the network when an application program on the multifunction device intends to use the peripheral device.

Therefore, when the conventional technology is simply applied to the digital multifunction device, data addressed to the peripheral device connected to the communication device is required to be incorporated in an IP packet, and the data in the IP packet is required to be transferred to the peripheral device through a network interface over the network, though the peripheral device is locally connected to the communication device. Further, this process places a great load due to the generation of IP packets on the multifunction device.

Aspects of the present invention provides a communication device having a peripheral device which is available by a processing unit therein and a terminal device connected to a network.

In other aspects, the present invention provides a communication device which selects a function for controlling a peripheral device according to an instruction from an internal processing unit and another function for controlling a peripheral device according to an instruction issued from a terminal device connected to a network in a proper manner, if necessary.

According to an aspect of the present invention, there is provided a communication device having a processing unit, a network interface, a communication interface, an interface control unit, a device control unit, and a relay unit. The network interface communicates with a terminal device connected to a network. The communication interface communicates with a locally connected peripheral device. The interface control unit controls the communication interface and transmits control data to the peripheral device, the control data being for controlling the peripheral device. The device control unit generates the control data for the peripheral device in accordance with an instruction entered from the processing unit, and transmits the control data to the interface control unit. The relay unit extracts the control data for the peripheral device from a packet received by the network interface, and transmits the control data to the interface control unit.

According to an aspect of the present invention, there is provided a method for controlling a communication device having a network interface for communicating with a terminal device connected to a network, the network interface receiving a packet from the terminal device; a communication interface for communicating with a locally connected peripheral device; and an interface control unit for controlling the communication interface and transmitting control data to the peripheral device, the control data being for controlling the peripheral device. The method includes: extracting control data from the packet and transmitting the extracted control data to the interface control unit as a network control mode controlling the peripheral device; and generating the control data according to an instruction entered from the processing unit and transmitting the generated control data to the interface control unit as an internal control mode controlling the peripheral device.

According to an aspect of the present invention, there is provided a terminal device having a main unit, a network interface, a local interface, an interface control unit, an extraction unit, a processing unit, and a mode switching unit. The main unit is connected with a peripheral device. The network interface is provided in the main unit and connected to a network for communicating with another terminal device connected to the network, the network interface receiving a packet from the another terminal device. The local interface is provided in the main unit to communicate with the peripheral device. The interface control unit controls the local interface to transmit control data to the peripheral device, the control data being for controlling the peripheral device. The extraction unit extracts the control data from the packet and transmits the extracted control data to the interface control unit as a network control mode. The processing unit issues an instruction for the peripheral device, generates the control data according to the instruction, and transmits the generated control data to the interface control unit as an internal control mode. The mode switching unit switches between the extraction unit and the processing unit to selectively activate the network control mode and the internal control mode.

BRIEF DESCRIPTION OF THE DRAWINGS

The particular features and advantages of the invention as well as other objects will become apparent from the following description taken in connection with the accompanying drawings, in which:

Illustrative aspects in accordance with the invention will be described in detail with reference to the following figures wherein:

FIG. 6 is a flowchart illustrating a connection accepting process;

FIG. 7 is a diagram showing a connected device table TBL stored in the RAM of the controller of the multifunction device;

FIG. 8 is a flowchart illustrating a connection request accepting process executed by the controller when a connection request is generated;

FIG. 9 is a flowchart showing a disconnection request accepting process that the controller executes when a disconnection request is generated;

FIGS. 10A and 10B are examples of an operation window for the disconnection request;

FIG. 11 is a flowchart illustrating a removal accepting process that the controller executes when the USB device is removed;

FIG. 19 is a flowchart illustrating a content updating management process;

FIG. 21 is a flowchart showing a content updating process;

FIG. 22 shows an example of RSS data having an ITEM element whose distributed content is audio content;

FIG. 23 shows another example of RSS data;

FIG. 27A is an explanatory diagram showing the structure of a content updating data table TBL stored in a storage unit of a music player 40;

FIG. 27B is an explanatory diagram showing the structure of a content updating data table TBL in the multifunction device;

FIGS. 28A and 28B are flowcharts illustrating a content updating management process executed by the controller of the multifunction device 1;

DETAILED DESCRIPTION

Next, an embodiment of the present invention will be described while referring to the accompanying drawings.

Figure 1:
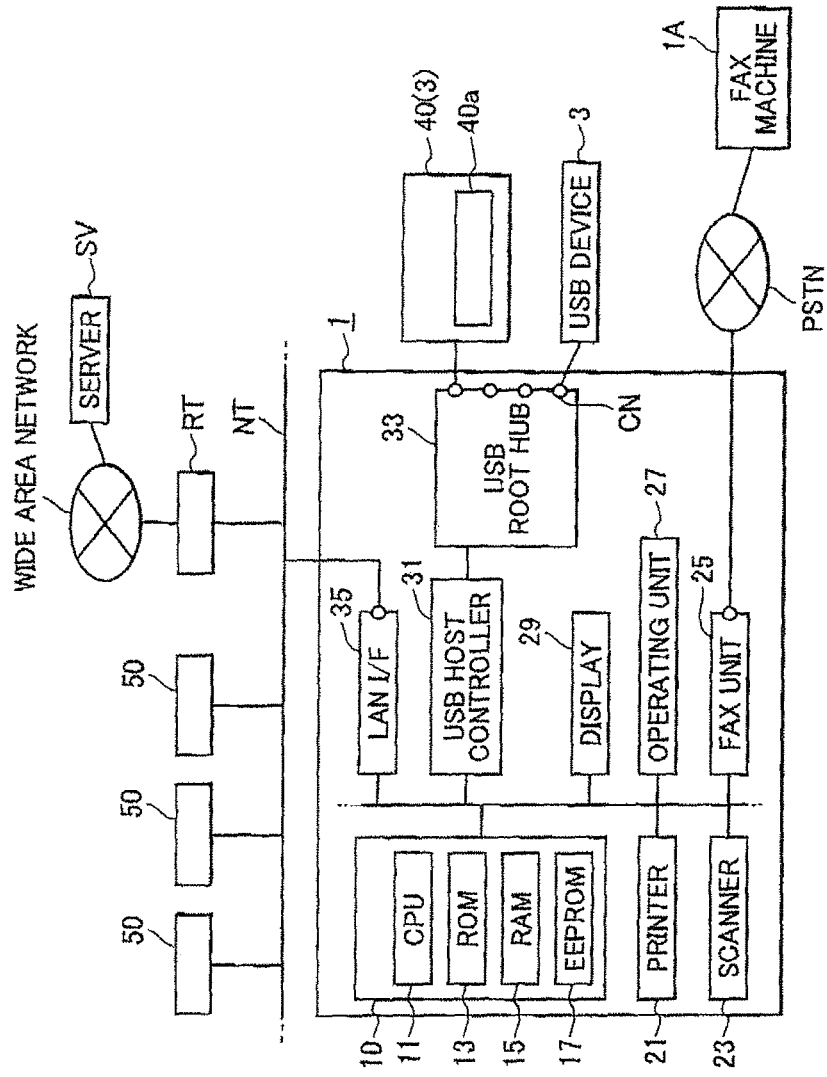
FIG. 1 is a diagram showing a multifunction device connected to a network.

FIG. 1 shows a local area network (LAN) NT to which a multifunction device 1 and a plurality of terminal devices 50 are operationally connected. In the following description, the local area network NT is designated as "network NT" hereinafter. The terminal device 50 is any communication device connectable to the network NT such as a personal computer (PC), a printer, any type of a multifunction device, which has a communication function to one another through the network NT.

Referring to FIG. 1, the digital multifunction device 1 has a copier function, a printer function, a scanner function, a facsimile function, and a universal serial bus (USB) device server function, which is described later. A controller 10 is provided in the multifunction device 1 for executing corresponding processes for implementing each of the above functions. The multifunction device 1 may have a content collecting function, which is described later.

In addition to the controller 10, the multifunction device 1 also includes a printing unit 21, a scanning unit 23, a fax communication unit 25, an operating unit 27, a display unit 29, a USB host controller 31, a USB root hub 33, and a LAN interface 35, all of which are used to implement the above functions.

The controller 10 includes a CPU 11 for executing various programs, a ROM 13 for storing the various programs, a RAM 15 serving as a work area, and a EEPROM 17 for storing various settings information. The CPU 11 executes the programs stored in the ROM 13 in order to control each component in the multifunction device 1 for implementing the function described above.

The printing unit 21 consists of a laser printer or an inkjet printer to form an image on a sheet. Specifically, the controller 10 controls the printing unit to feed the sheet from a paper supply section (not shown) and to print an image on the sheet corresponding to image data supplied by the controller 10. The printing unit 21 is used for implementing the copier function, printer function, and facsimile function.

The scanning unit 23 optically scans an original document placed on a support surface (not shown) and generates image data representing the scanned image. The controller 10 controls the scanning unit 23 to scan the original document and supply the image data based on the original to the controller 10. The scanning unit 23 is used to implement the copier function, facsimile function, and scanner function.

The fax communication unit 25 transmits image data supplied by the controller 10 to another facsimile machine 1A via a public switched telephone network (PSTN) in the form of facsimile signals. The fax communication unit 25 converts facsimile signals received from another facsimile machine through the PSTN into image data that can be used by the controller 10. The fax communication unit 25 thus implements facsimile transmissions and receptions.

The operating unit 27 includes various keys that a user can operate. The operating unit 27 accepts user operations on the keys and notifies the controller 10 of the operation details.

The display unit 29 is configured of a liquid crystal display (LCD). The controller 10 controls the display unit 29 to display various data for the user in the form of text or images.

The USB host controller 31 and USB root hub 33 constitute a USB interface as a communication interface or a local interface. The USB root hub 33 is connected to the USB host controller 31. The controller 10 controls the USB host controller 31 to generate USB data and transmit the USB data to the USB root hub 33. The USB host controller 31 also receives USB data from the USB root hub 33 in order to communicate with a USB device 3 connected to the USB root hub 33. Further, the USB host controller 31 transmits USB data transmitted by the controller 10 to the USB device 3 that is the destination of the USB data. The USB host controller 31 transmits USB data supplied from the USB device 3 into the controller 10. The USB root hub 33 includes a plurality of USB ports CN. Each USB port CN receives a terminal of the USB devices 3 so that the same number of the USB devices 3 as the number of the ports CN can be connected to the multifunction device 1.

In the present invention, the USB device 3 is a USB-compliant peripheral device operationally connected to the USB port CN of the multifunction device 1 in order to expand the functionality of multifunction device 1. And, the USB data is data compliant with Universal Serial Bus standard and identified by any USB device 3, including a command for the USB device 3 and data to be processed by the USB device 3. One or more USB device(s) 3 can be connected to the multifunction device 1 through the USB port CN individually.

In this embodiment, the USB device 3 is a portable storage device, such as a USB memory device. Content stored in the USB device 3 may include Web pages, text data, music data, voice data, image data, and video data.

In some embodiments, the USB devices 3 may be a music player 40 used for the content collecting function. The music player 40 is a digital player capable of playing back MPEG music data. The music player 40 includes a storage unit 40a configured of a semiconductor memory or a magnetic recording device such as a magnetic floppy disk.

The LAN interface 35 is connected to the network NT in order to connect the multifunction device 1 to the network NT. The controller 10 controls the LAN interface 35 to communicate with a node on the network NT. Specifically, the network NT is configured of an Internet Protocol (IP) network. The network NT is connected to the internet including a wide area network (WAN) through a router RT.

A server SV for distributing text content, still image content, video content, and audio (music) content is provided on the Internet. The multifunction device 1 may acquire the above content from the server SV through the network NT and the LAN interface 35.

The LAN interface 35 is also used for implementing the USB device server function. The USB device server function is a function by which the USB device 3 connected to the multifunction device 1 can be available to another terminal device 50 connected to the network NT.

In addition to the USB device server function, the multifunction device 1 has an internal control function for controlling the USB device 3 based on a command from an application program installed in the controller 10. The controller 10 switches the USB device server function and the internal control function by a USB management program 107. A content collection program 109 for collecting content from the server SV and storing the collected content in the USB device 3 may installed on the multifunction device 1 as the application program.

Figure 2A:
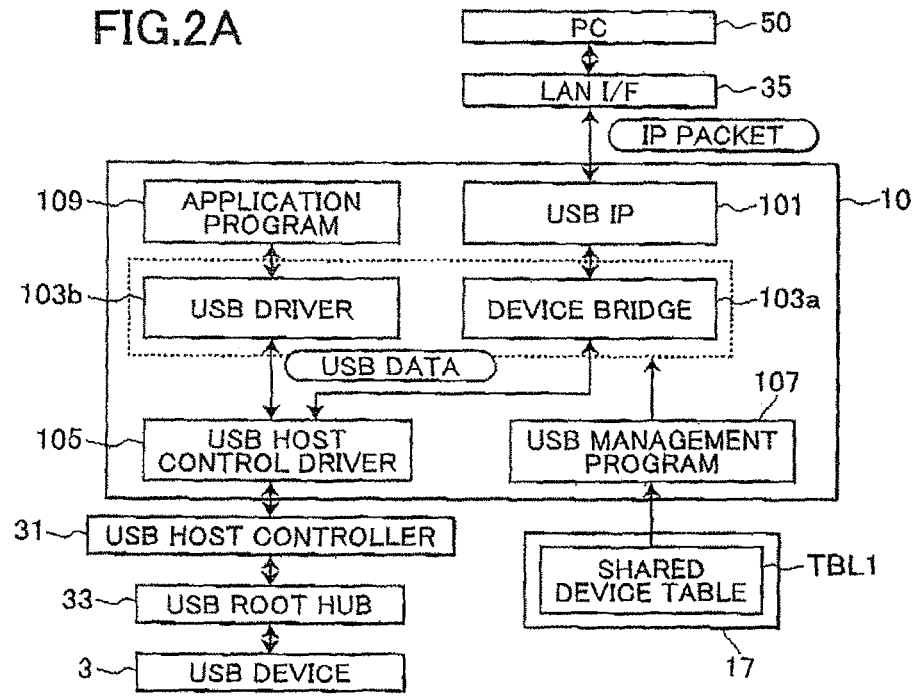
FIG. 2A is a block diagram showing a controller of the multifunction device.

As shown in FIG. 2, in order to implement the USB device server function, the controller 10 executes programs including a USB IP 101, a device bridge 103a, and a USB host control driver 105. When implementing the USB device server function, the CPU 11 loads and executes the device bridge 103a. Likewise, in order to implement the internal control function, the CPU 11 loads and executes the USB driver 103b corresponding to the USB device 3.

The USB IP 101 is a program that receives IP packets from the network NT via the LAN interface 35, extracts USB data from the IP packets, and transmits the USB data into the device bridge 103a corresponding to the USB device 3 given as the destination of the USB data. Similarly, the USB IP 101 receives USB data from the device bridge 103a, generates an IP packet including the USB data, and transmits the generated IP packet to the network NT. In this embodiment, the USB IP 101 is a USB over IP (registered trademark) program.

The USB IP 101 stores a relation between an IP address of the terminal device 50 which has transmitted the IP packet and the USB device 3 as the destination of the USB data in the IP packet under the USB management program 107. Generally, the IP packet is transmitted from the terminal device 50 with a command thereof. Based on the relation, the USB IP 101 can send the USB data included in the IP packet which has been received from the terminal device 50 to the designated USB device 3, and transmit the USB data from the USB device 3 via the device bridge 103a to the terminal device 50 in response to the command issued from the terminal device 50.

The device bridge 103a relays USB data between the USB IP 101 and the USB host control driver 105. The device bridge 103a has a function for transferring USB data from the USB IP 101 to the USB host control driver 105 and for transferring USB data from the USB host control driver 105 to the USB IP 101.

When USB data targeted for transmission is inputted into the USB host control driver 105, the USB host control driver 105 controls the USB host controller to output this USB data on the transmission path downstream of the USB host controller 31 (the USB root hub 33 side) so that the USB data is transmitted to the USB device 3 designated as the destination in the USB data. The USB host control driver 105 also has a function for receiving USB data through the USB root hub 33 via the USB host controller 31 and for transmitting the received USB data to the USB driver 103b or device bridge 103a corresponding to the USB device 3.

The USB driver 103b loaded in place of the device bridge 103a when implementing the internal control function is a program well known in the art for controlling USB devices 3. The USB driver 103b generates USB data based on commands received from the application program which intends to use the USB device 3 for imposing operations on the USB device 3, and transmits the USB data to the USB device 3 via the USB host control driver 105. The USB driver 103b also provides USB data received from the USB device 3 via the USB host control driver 105 to the application program.

Figure 2B:
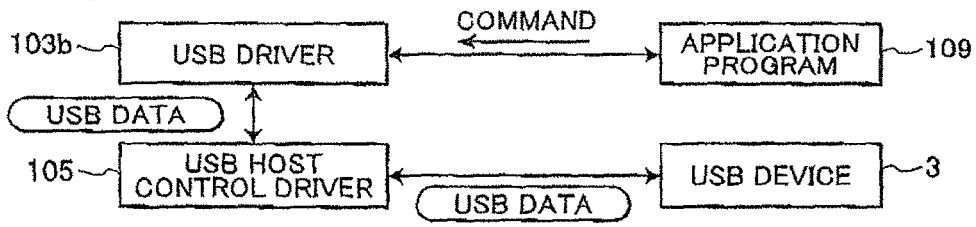
FIG. 2B is a block diagram showing an internal control function.
Figure 2C:
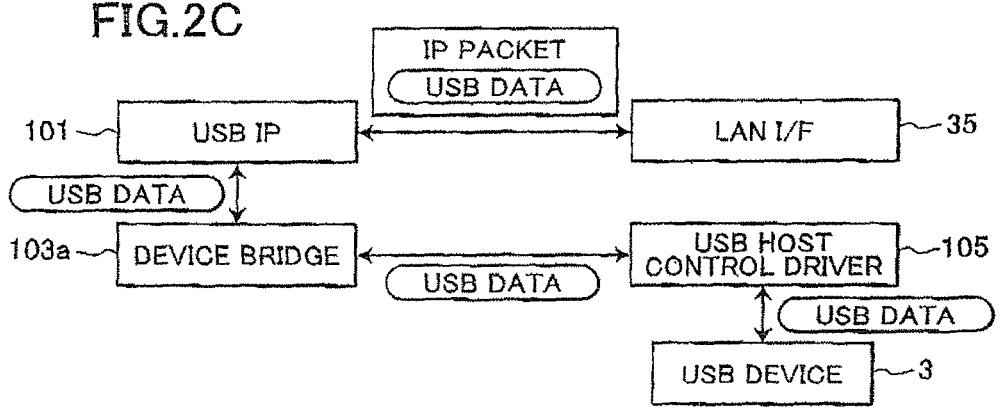
FIG. 2C is a block diagram showing a USB device server function.

Hence, the USB driver 103b is loaded in the controller 10 when implementing the internal control function of the multifunction device 1. Together with the USB host control driver 105, the USB driver 103b configures the control system for the USB device 3, as shown in FIG. 2B. On the other hand, when implementing the USB device server function, the device bridge 103a is loaded in the controller 10 in place of the USB driver 103b. Together with the USB IP 101 and the USB host control driver 105, the device bridge 103a configures the control system for the USB device 3, as shown in FIG. 2C.

As described above, the USB management program 107 selects which of the device bridge 103a and USB driver 103b is loaded in the controller 10 for each USB device 3. For example, the USB management program 107 may switch between the device bridge 103a and USB driver 103b based on shared settings in a shared device table TBL1 stored in the EEPROM 17.

Figure 3:
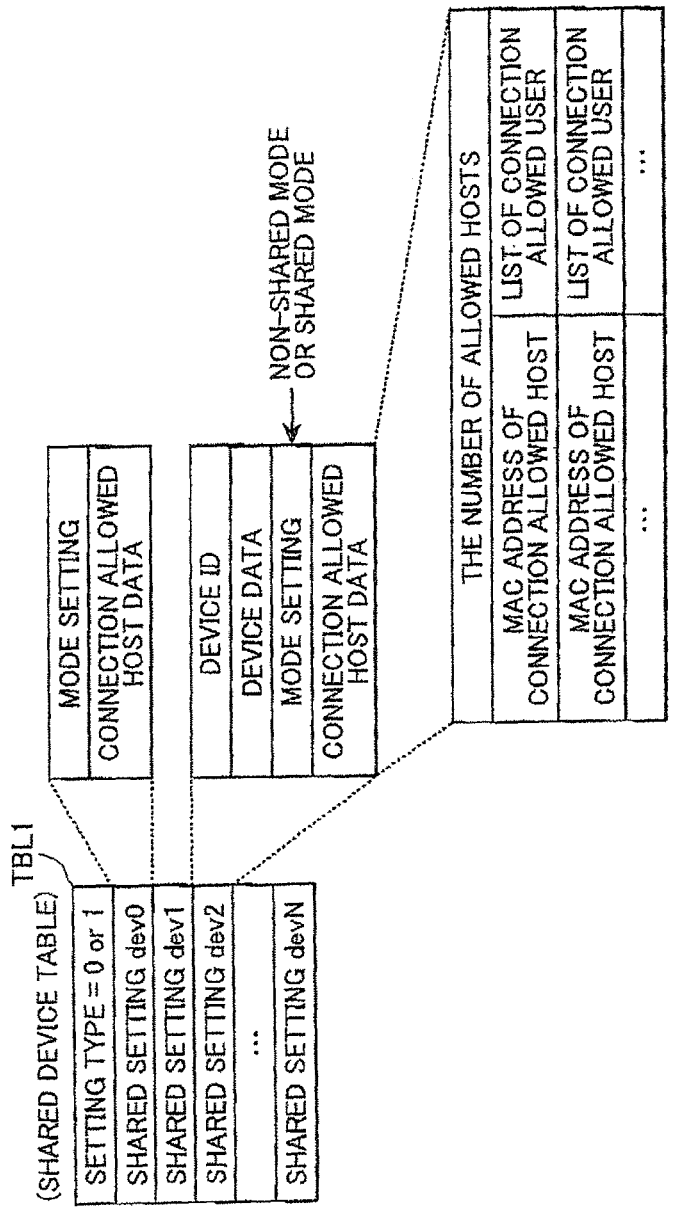
FIG. 3 is a diagram showing a shared device table TBL1 stored in a EEPROM.

As shown in FIG. 3, the shared device table TBL1 stored in the EEPROM 17 is configured of a setting type, and a plurality of shared settings. The setting type is data indicating whether the setting for the USB device server function is to be set for each USB device or common for all USB devices. Specifically, when the setting type is given the value "0", the controller 10 references the shared settings dev_0 and controls each USB device 3 according to settings indicated in the shared settings dev_0 that are common to all USB devices 3.

However, when the setting type is set to "1", the controller 10 controls each USB device 3 based on the shared settings dev_i (where i=1-N) provided for each USB device according to settings indicated in the shared settings dev_i for the corresponding USB device 3.

Here, the shared settings dev_0 are configured of a mode setting, and connection allowed host data. The other shared settings dev_i (i=1-N) are configured of a device identification (ID) assigned to each USB device 3; device data representing a USB version number, device class, vendor ID, and product ID; a mode setting; and connection allowed host data. In this embodiment, the host means the terminal device 50 connected to the network NT.

The mode setting takes on one of the values indicating a "shared mode" or a "non-shared mode." When the mode setting indicates the shared mode, the controller 10 activates the USB device server function for the USB device 3, enabling the terminal device 50 on the network NT to use the USB device 3. When the mode setting indicates the non-shared mode, the controller 10 activates the internal control function for the USB device 3 so that the multifunction device 1 can exclusively use the USB device 3.

The connection allowed host data is valid only when the mode setting is the shared mode and includes data for the number of allowed hosts, and user address data for each allowed host. A connection allowed host is a terminal device 50 on the network NT permitted to use the USB device 3 via the network NT through the USB device server. More particularly, the connection allowed host means the terminal device 50 which is connected to the network NT and allowed to access the USB device 3.

The number of allowed hosts is data indicating the number of hosts that can use the USB device 3 via the network NT. The number of allowed hosts is identical to the number of user address data entries. The user address data for each allowed host is configured of a MAC address for the host, and a list of users allowed access to the USB device 3 from the allowed host. This list includes names of users that are allowed access to the USB device 3.

When the USB device 3 is first connected, the USB management program 107 generates the shared settings and records these settings in the shared device table TBL1 in the EEPROM 17. Subsequently, the USB management program 107 may edit and update the shared settings based on instructions inputted by the user through the operating unit 27.

Figure 4:
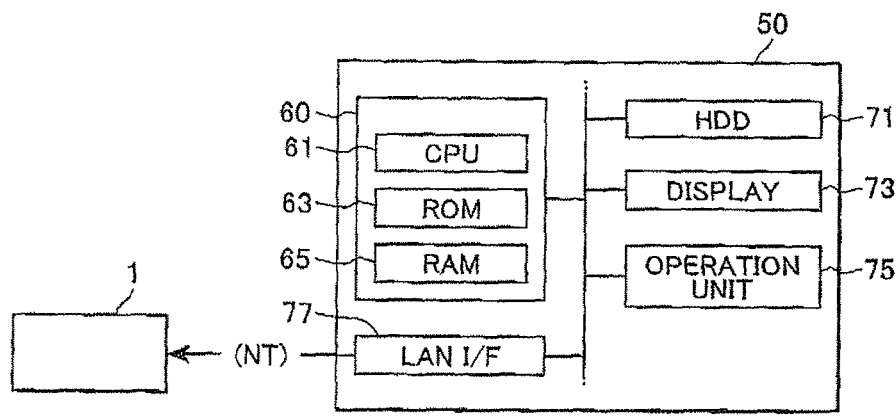
FIG. 4 is a block diagram showing a terminal device.

Next, the configuration of the terminal device 50 connected to the network NT will be described. Referring to FIG. 4, the terminal device 50 includes a controller 60, a hard disk drive 71 storing various programs, a display unit 73 configured of a liquid crystal display, an operating unit 75 configured of a keyboard or pointing device, and a LAN interface 77.

The LAN interface 77 is connected to the network NT and is capable of communicating with the multifunction device 1 through the network NT. The controller 60 also includes a CPU 61 for executing various programs, a ROM 63 for storing a boot program, and a RAM 65 serving as a work area. By executing various programs, the CPU 61 controls all components in the terminal device to implement various functions. For example, the controller 60 may communicate with the multifunction device 1 via the LAN interface 77, transmit image data to the multifunction device 1, and instruct the multifunction device 1 to print an image based on the transmitted image data on paper.

Additionally, the controller 60 may control the USB devices 3 connected to the multifunction device 1 via the network NT based on a command from an application program installed on the controller 60. For example, the controller 60 may control the music player 40 connected to the multifunction device 1 via the network NT based on a command from a music playback program installed on the controller 60, read content in the music player 40, and playback the content.

Figure 5:
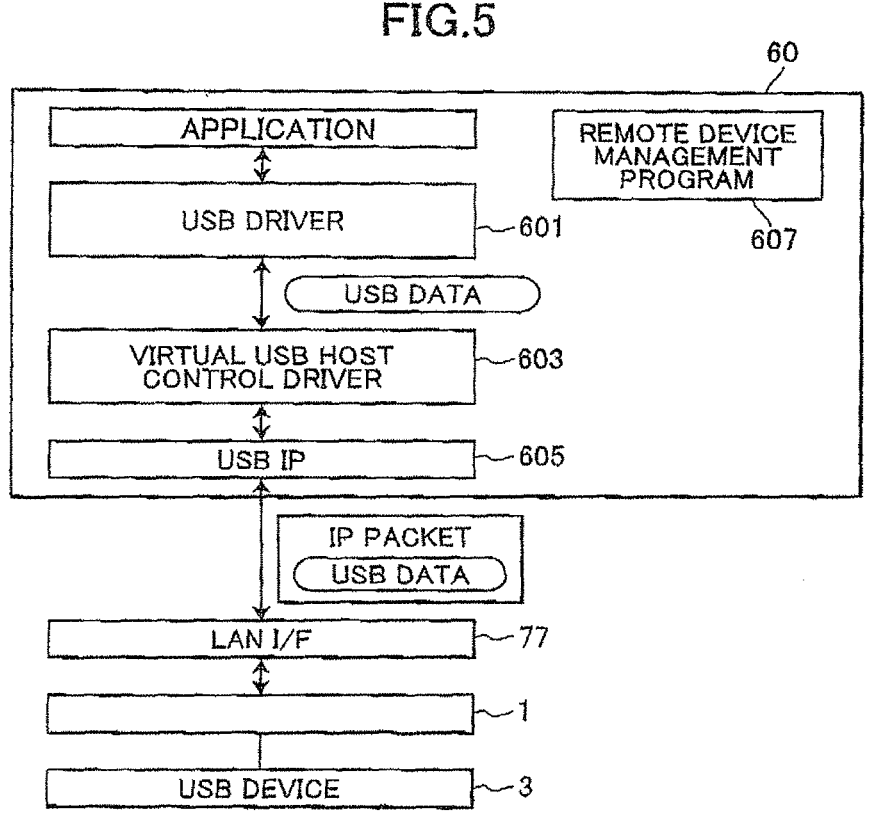
FIG. 5 is a block diagram showing a controller of the terminal device.

Referring to FIG. 5, in order to control the USB device 3 via the network NT, the controller 60 executes programs as a USB driver 601, a virtual USB host control driver 603, and a USB IP 605.

The USB IP 605 is a USB over IP (registered trademark) program that extracts USB data from an IP packet received via the network NT through the LAN interface 77 and transmits the extracted USB data into the virtual USB host control driver 603. The USB IP 605 generates an IP packet from USB data received from the virtual USB host control driver 603 and transmits the IP packet to the multifunction device 1 having the USB device 3 designated as the destination of the USB data.

A remote device management program 607 is provided for storing information associated with the USB device 3 and the IP address of the multifunction device 1 connected to the USB devices 3 in the USB IP 605. In this way, the remote device management program 607 enables the terminal device 50 communication between the USB devices 3 connected to the multifunction device 1.

The virtual USB host control driver 603 is a program for relaying USB data between the USB driver 601 and USB IP 605. The virtual USB host control driver 603 transmits the USB data received from the USB IP 605 into the USB driver 601 corresponding to the USB device 3 that has transmitted the USB data in the IP packet, and transmits USB data received from the USB driver 601 into the USB IP 605.

The USB driver 601 is a program for controlling the USB devices 3 connected to the multifunction device 1. The USB driver 601 generates USB data based on a command from an application program which intends to use the USB device 3 in order to impose an operation corresponding to the command on the USB device 3, and transmits the USB data to the USB device 3 on the network NT via the virtual USB host control driver 603. The USB driver 601 accepts USB data transmitted from the USB device 3 on the network NT via the virtual USB host control driver 603 and provides the accepted USB data to the application program.

The remote device management program 607 has a function for transmitting a request to the multifunction device 1 in order to operationally connect with or disconnect from the USB device 3 based on a user instruction.

Next, processes executed on the multifunction device 1 will be described in detail.

The USB management program 107 has a function for activating one of the USB device server function and the internal control function for each USB device 3 connected to the multifunction device 1. This function is implemented according to the following process.

Referring to FIG. 6, the controller 10 executes a connection accepting process according to the USB management program 107 when a USB device 3 is connected to the USB port CN.

At the beginning of the connection accepting process in S110, the controller 10 loads the USB driver 103*a* in order to acquire a device descriptor from the USB device 3, and in S120 acquires the device descriptor from the USB device 3 just connected to the USB port CN. In S125 the controller 10 unloads the USB driver loaded in S110. The device descriptor is well known in the art for providing information on a USB device 3, including the USB version number, device class, vendor ID, product ID, and other information.

In S130 the controller 10 references shared settings in the shared device table TBL1 in the EEPROM 17 for the connected USB device 3 based on data in the acquired device descriptor. If there are no corresponding shared settings (S140: NO), then the controller 10 advances to S150. If there are corresponding shared settings (S140: YES), the controller 10 advances to S160.

Here, the controller 10 determines whether shared settings exist in the shared device table TBL1 for the connected USB device 3. In other words, the controller 10 determines that shared settings exist in the shared device table TBL1 for the USB device 3 if the device data including the USB version number, device class, vendor ID, and product ID in the shared settings are the same as the device data indicated in the device descriptor acquired in S120. And the controller 10 determines there are no corresponding shared settings if there are no shared settings with device data matching the device data in the device descriptor.

When advancing to S150, the controller 10 records shared settings for the connected USB device 3 in the shared device table TBL1. More specifically, the controller 10 creates shared settings listing the ID assigned to the USB device 3 as the device ID; the USB version number, device class, vendor ID, and product ID indicated by the device descriptor as the device data; "non-shared mode" as the mode setting; and null data as the connection allowed host data, and records these shared settings in the shared device table TBL1. After recording the shared settings in the shared device table TBL1, the controller 10 advances to S160. In S160 the controller 10 records connected device data for the connected USB device 3 in a connected device table TBL2 stored in the RAM 15.

Referring to FIG. 7, the connected device table TBL2 is used to manage data on the USB device 3 connected to the USB port CN and includes connected device data for each USB device 3 connected to the USB port CN. Hence, each time a USB device 3 is connected to the USB port CN, connected device data for that USB device 3 is recorded in the connected device table TBL2 in the process of S160.

Specifically, the connected device data includes a device ID for the connected USB device 3, mode data indicating whether the mode set for the USB device 3 is the shared mode or the non-shared mode, and connected host data representing the terminal device 50 using the USB device 3. The connected host data indicates the MAC address of the terminal device 50 on the network NT using the USB device 3, and the name of the user using the USB device 3. The connected host data is set to null data if no terminal device 50 or user is currently occupying the USB device 3.

The connected host data includes the MAC address of the terminal device 50 on the network NT currently occupying the USB device 3, and the username of the user currently using the USB device 3.

Hence, in S160 the controller 10 creates connected device data based on the shared settings dev_i of the currently connected USB device 3 in the connected device table TBL2. The connected device data includes the mode data set to a value indicating the same mode as that in the shared settings (shared mode or non-shared mode); and the connected host data, last access time, and previously connected host MAC address, which are set to null values. The controller 10 records the connected device data in the connected device table TBL2. More specifically, the controller 10 generates connected device data based on the shared settings dev_i for the currently connected USB device 3 when the setting type in the shared device table TBL1 has the value "1" and generates connected device data based on the shared settings dev_0 when the setting type in the shared device table TBL1 is the value "0".

After completing the process in S160, the controller 10 ends the connection accepting process.

Next, a connection request accepting process will be described. The controller 10 executes the connection request accepting process based on the USB management program 107 in order to process a connection request for a USB device 3. The connection request is for operationally incorporating the designated USB device 3 to the control system of the multifunction device 1.

Referring to FIG. 8, at the beginning of the connection request accepting process in S210, the controller 10 determines whether the source of the connection request is a terminal device 50 on the network NT.

If the controller 10 determines that the source of the connection request is not the terminal device 50 on the network NT but an application program on the multifunction device 1 itself (S210: NO), then in S230 the controller 10 loads the USB driver 103*b* corresponding to the USB device 3 for which the connection request is directed, constructing a control system for the USB device 3 using the USB driver 103*b*. Subsequently, the controller 10 ends the connection request accepting process. However, if the USB driver 103*b* or the device bridge 103*a* for the corresponding USB device 3 has already been loaded when the connection request is received from the application program on the multifunction device 1, the controller 10 does not execute the process in S230 for constructing the control system for the USB device 3, but simply ends the connection request accepting process.

However, if the controller 10 determines that the source of the connection request is a terminal device 50 on the network NT (S210: YES), then in S240 the controller 10 determines whether the source is a connection allowed host or a legitimate user allowed access to the USB device 3. The controller 10 makes this determination based on the shared device table TBL1 in the EEPROM 17.

Specifically, the controller 10 references the shared settings dev_0 when the setting type in the shared device table TBL1 is "0", references the shared settings dev_i of the USB device 3 for which the connection request has been issued when the setting type in the shared device table TBL1 is "1", and determines whether the mode specified in the referenced shared settings is the shared mode. The controller 10 determines that the source of the connection request is not a legitimate user when the mode specified in the referenced shared settings is not the shared mode (S240: NO), and subsequently ends the connection request accepting process.

However, when the mode specified by the referenced shared settings is the shared mode, the controller 10 determines that the source of the connection request is a connection allowed host and user who is allowed to access to the USB device 3, based on the connection allowed host data specified in the shared settings. The controller 10 makes this determination by comparing the connection allowed host data with data provided together with the connection request that indicates the MAC address and username for the source of the address. However, the controller 10 treats all USB devices 3 as being open to terminal device 50 when the connection allowed host data is null data, regardless of whether the mode specified in the shared settings is the shared mode. In this case, the controller 10 determines that the source of the connection request is a legitimate user for all terminal devices 50, independent of the MAC address and username attached to the connection request.

If the controller 10 determines that the source of the connection request is not a legitimate user based on the referenced shared settings (S240: NO), then the controller 10 ends the connection request accepting process. However, if the controller 10 determines that the source is a legitimate user (S240: YES), then the controller 10 advances to S250. When the controller 10 makes the determination in S240, if the control system for the USB device 3 targeted by the connection request has already been constructed and another user is occupying the USB device 3, then the controller 10 treats the source of the connection request as illegitimate, and ends the connection request accepting process.

In S250 the controller 10 loads the device bridge 103*a* and constructs a control system for the USB device 3 using the device bridge 103*a* (see FIG. 2C). After loading the device bridge 103*a*, in S260 the controller 10 sets a relation for the USB IP 101 between the IP address of the source and the requested USB device 3, connecting the USB device 3 with the terminal device 50 making the request so that USB communications between the two are possible.

In S270 the controller 10 edits the connected device data for the requested USB device 3 in the connected device table TBL2, updates the connected host data constituting the connected device data with data configured of the MAC address and username for the terminal device 50 making the current connection request, and updates the last access time to the current time. Subsequently, the controller 10 ends the connection request accepting process.

Next, a disconnection request accepting process will be described. The disconnection request is for requesting that the temporarily constructed control system for the USB device 3 be released. The controller 10 executes this disconnection request accepting process based on the USB management program 107 in order to process the disconnection request.

Referring to FIG. 9, at the beginning of the disconnection request accepting process in S310, the controller 10 determines whether the disconnection request is a legitimate request. Specifically, the controller 10 treats the disconnection request generated by an application program in the multifunction device 1 itself as a legitimate request and treats a disconnection request received via the network NT as an illegitimate request when the USB device 3 targeted by the disconnection request is operating in the non-shared mode.

The controller 10 treats a disconnection request generated by an application program on the multifunction device 1 itself and a disconnection request received from the terminal device 50 currently connected to the USB device 3 via the network NT as a legitimate request when the USB device 3 targeted by the disconnection request is operating in the shared mode. And the controller 10 treats the disconnection request received from the terminal device 50 on the network NT which has not currently been connected to the USB device 3 as an illegitimate request.

When the controller 10 determines that the disconnection request is not a legitimate request (S310: NO), then the controller 10 ends the disconnection request accepting process without executing any of the steps from S330.

However, when the controller 10 determines that the disconnection request is a legitimate request (S310: YES), then in S330 the controller 10 determines whether the disconnection request targets the USB device 3 occupied by the terminal device 50 issuing the disconnection request on the network NT. If the controller 10 determines that the disconnection request targets the occupied USB device 3 (S330: YES), then in S340 the controller 10 unloads the device bridge 103*a* configuring the control system of the USB device 3, temporarily deactivating the control system of the USB device 3 using the device bridge 103*a* so that the terminal device 50 on the network NT currently using the USB device 3 can no longer use the USB device 3.

In S350 the controller 10 clears the connected host data contained in the connected device data for the USB device 3 from the connected device table TBL2 and updates the connected device data corresponding to the USB device 3. Subsequently, the controller 10 ends the disconnection request accepting process.

However, if the controller 10 determines in S330 that the disconnection request does not target the USB device 3 currently occupied by the terminal device 50 on the network NT (S330: NO), then in S360 the controller 10 unloads the USB driver 103*b* constituting the control system of the USB device 3, temporarily deactivating the control system for the USB device 3 using the USB driver 103*b* so that the USB device 3 cannot be accessed. Subsequently, the controller 10 ends the disconnection request accepting process.

The controller 10 also makes a NO determination in S330 when the disconnection request targets the USB device 3 that has already been disconnected, i.e. when neither the device bridge 103*a* and USB driver 103*b* has been loaded to configure a control system for the USB device 3. In this case, the controller ends the disconnection request accepting process without executing the process in S360.

The application program for issuing a disconnection request is installed on the multifunction device 1. The program displays the operation window shown in FIG. 10 on the display unit 29. By performing operations in the window shown in FIG. 10, the user can remove a connection for the USB device 3 on the multifunction device 1. The operation window shown in FIG. 10A is displayed by the application program when the user inputs a display command via the operating unit 27 to display a disconnect device window. The disconnect device window shown in FIG. 10A lists the USB devices 3 that are currently connected and provides a cursor for selecting one of the USB devices 3. Once the user has selected one of the USB devices 3 in the disconnect device window, the controller 10 displays the confirmation window shown in FIG. 10B prompting the user to select either "disconnect" or "cancel" based on the above program. If the user selects "disconnect" in the confirmation window through operations on the operating unit 27, the controller 10 inputs a disconnection request for disconnecting the selected USB device 3 into a task executing a disconnection request accepting process.

After the controller 10 accepts the disconnection described above, the USB device 3 connected to the USB port CN of the multifunction device 1 can be removed from the USB port CN. FIG. 11 shows a removal accepting process that the controller 10 executes when the USB device 3 is removed from the USB port CN.

Referring to FIG. 11, at the beginning of the removal accepting process in S410, the controller 10 identifies the connected device data for the USB device 3 removed from the USB port CN. In S420 the controller 10 deletes the connected device data identified in S410 from the connected device table TBL2, and subsequently ends the removal accepting process.

The USB management program 107 also has a function for accepting user operations performed on the operating unit 27 to modify the mode setting or update connection allowed hosts and users. When the user performs an operation on the operating unit 27 to display a settings modification window, the controller 10 executes a connected device settings modification process shown in FIG. 12 based on the USB management program 107. Prior to executing this process, the controller 10 prompts the user to input an administrator password and only proceeds with the connected device settings modification process when the user inputs the correct administrator password through the operating unit 27.

Figure 12:
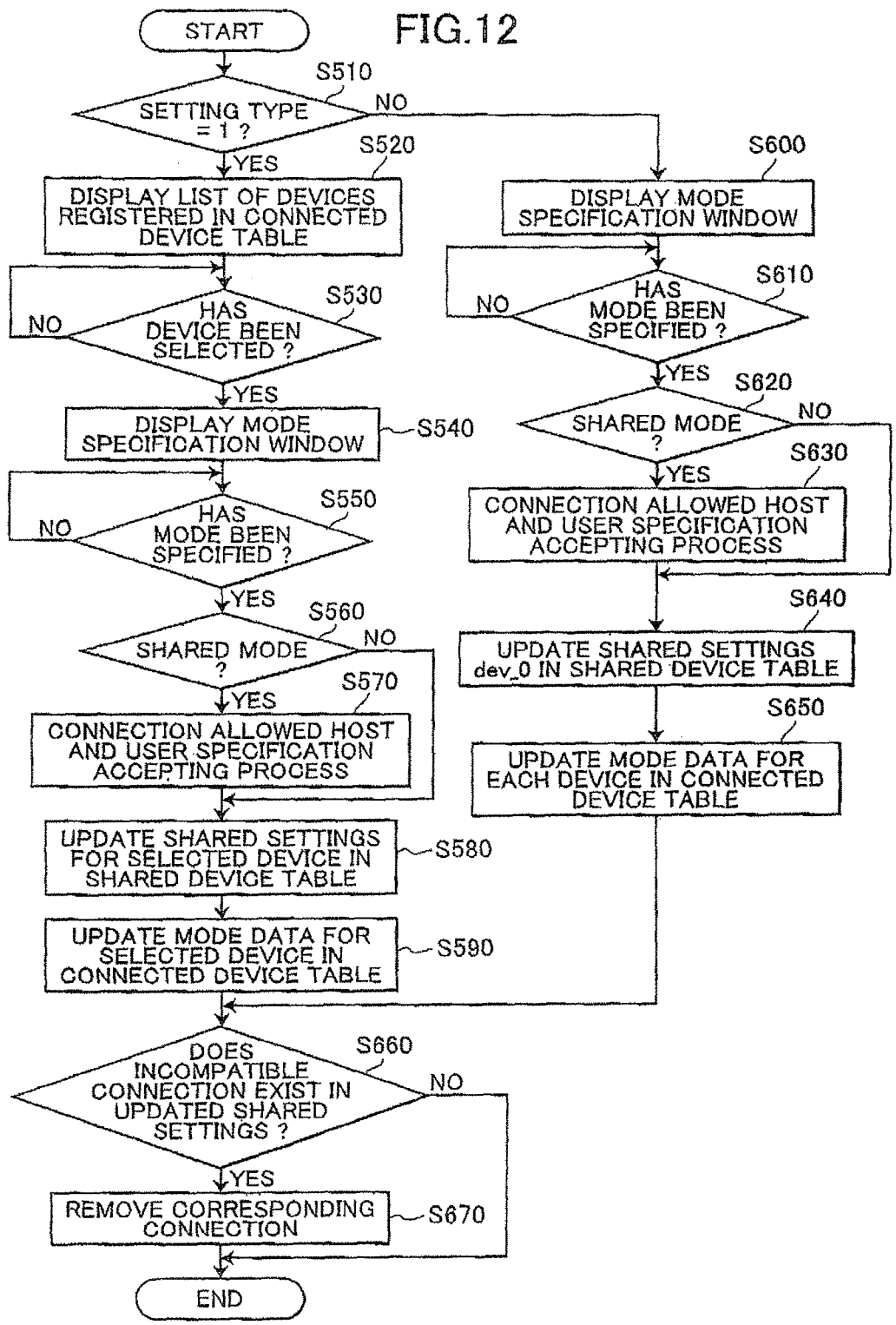
FIG. 12 is a flowchart showing a connected device settings modification process.

Referring to FIG. 12, at the beginning of the connected device settings modification process in S510, the controller 10 references the setting type in the shared device table TBL1 and determines whether the setting type is the value "1". If the setting type is set to "1" (S510: YES), then in S520 the controller 10 displays a list of USB devices 3 currently connected to the USB port CN on the display unit 29 based on records in the connected device table TBL2. In S530 the controller 10 waits until the user performs an operation on the operating unit 27 to select one of the USB devices 3 in the displayed list as the settings modification target. When one of the USB devices 3 has been selected as the settings modification target (S530: YES), in S540 the controller 10 displays a mode specification window on the display unit 29 for the selected USB device 3.

The mode specification window enables the user to specify via the operating unit 27 whether to set the mode of the USB device 3 to the shared mode or the non-shared mode. In S550 the controller 10 waits until the user has completed a mode setting operation. When the mode setting operation is complete (S550: YES), the controller 10 determines in S560 whether the specified mode is the shared mode. If the specified mode is the shared mode (S560: YES), then the controller 10 executes the process in S570 and advances to S580. When the specified mode is the non-shared mode (S560: NO), the controller 10 advances to S580 without executing the process in S570.

The process executed in S570 is a connection allowed host and user specification accepting process. In this process, the controller 10 obtains specification data including a host MAC address and username allowed access to the USB device 3, which data the user has inputted via the operating unit 27.

Upon advancing to S580, the controller 10 updates the shared settings dev_i to reflect the mode and the connection allowed host and user name specified by the user in the above process for the USB device 3 selected from the shared device table TBL1. Subsequently, in S590 the controller 10 updates the connected device data in the connected device table TBL2 for the selected USB device 3 to reflect the mode specified by the user in the above process, and advances to S660.

However, if the controller 10 determines in S510 that the setting type is set to the value "0" instead of the value "1" (S510: NO), then the controller 10 advances to S600 and displays the mode specification window on the display unit 29 for accepting data specifying the mode to be set for all USB devices from the user.

The mode specification window displayed in S600 is similar to the mode specification window displayed in S540 and enables the user to specify through operations on the operating unit 27 whether to set the mode to the shared mode or the non-shared mode. After displaying the mode specification window, the controller 10 waits in S610 until the user has completed a mode specification operation. When the mode specification operation is complete (S610: YES), the controller 10 determines in S620 whether the specified mode is the shared mode. If the specified mode is the shared mode (S620: YES), in S630 the controller 10 executes the connection allowed host and user specification accepting process to obtain data inputted by the user via the operating unit 27, the data specifying the host MAC address and username allowed access to the USB device 3. After completing the process in S630 the controller 10 advances to S640. However, if the controller 10 determines in S620 that the specified mode is the non-shared mode (S620: NO), the controller 10 advances to S640 without executing the process of S630.

After advancing to S640, the controller 10 updates the shared settings dev_0 in the shared device table TBL1 to reflect the mode and the connection allowed host and username specified by the user in the above processes. In S650 the controller 10 updates each connected device data entry in the connected device table TBL2 to reflect the mode specified by the user in the above process, and subsequently advances to S660.

Upon advancing to S660, the controller 10 determines whether the updated shared settings do not conform to the current environment. Specifically, the updated shared settings do not conform to the current environment if there exists a USB device 3 operating in a mode incompatible with the shared settings or if a user other than the connection allowed host and user is connected to the USB device 3.

If the controller 10 determines that an incompatibility exists (S660: YES), then in S670 the controller 10 cancels the control system for the USB device 3 determined to be incompatible. Specifically, in S670 the controller 10 unloads the USB driver 103b or the device bridge 103a corresponding to the incompatible USB device 3 to remove the current connection. In addition to removing this connection, in S670 the controller 10 updates each connected device data entry in the connected device table TBL2 to conform to the state after this disconnection. In other words, the controller 10 clears the connected host data for the disconnected USB device 3. After completing the process in S670, the controller 10 ends the connected device settings modification process. However, if the controller 10 determines in S660 that no incompatibilities have been produced (S660: NO), then the controller 10 ends the connected device settings modification process without executing the process in S670.

The USB management program 107 also has a function for updating shared settings stored in the shared device table TBL1 based on a settings update request received via the network NT and for providing requested data to the source of the request via the network NT based on a data notification request received via the network NT. The controller 10 implements this function by executing an external request accepting process shown in FIG. 13 based on the USB management program 107. The controller 10 executes this process when an external request is received via the network NT from a terminal device on the network NT. The external request is a request transmitted form a terminal device 50 on the network NT to the multifunction device 1.

Figure 13:
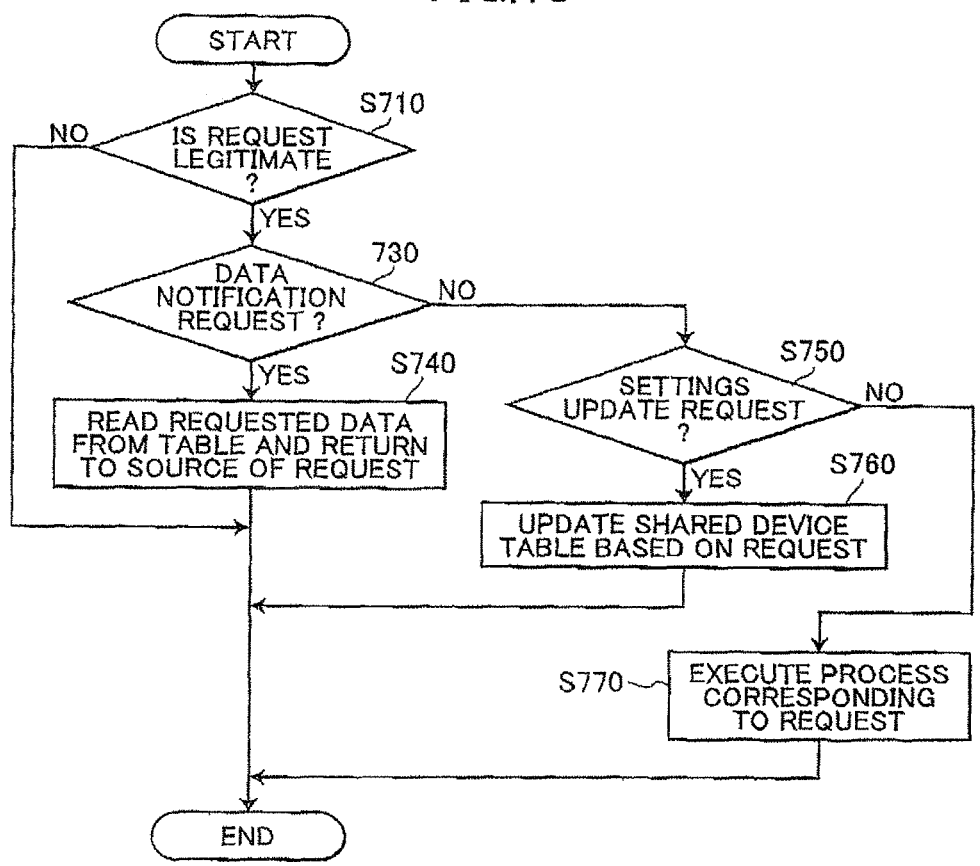
FIG. 13 is a flowchart illustrating an external request accepting process.

Referring to FIG. 13, at the beginning of the external request accepting process in S710, the controller 10 determines whether the external request is a legitimate request. For example, if the external request is a list data notification request (described later in detail) requesting a list of the USB devices 3 connected to the multifunction device 1, the controller 10 determines without exception that the received external request is a legitimate request. However, if the external request is a detailed data notification request requesting shared settings from the shared device table TBL1, or a settings update request, the controller 10 determines whether the administrator password included in the request matches the administrator password registered in the multifunction device 1. The controller 10 determines that the external request is legitimate if the passwords match, and illegitimate if the passwords do not match.

If the controller 10 determines in S710 that the external request is legitimate (S710: YES), then in S730 the controller 10 determines whether the external request is a data notification request (a list data notification request or a detailed data notification request). If the external request is a data notification request (S730: YES), then in S740 the controller 10 reads the requested data from the connected device table TBL2 or the shared device table TBL1 and transmits this data to the device issuing the request via the network NT.

For example, if the external request is a list data notification request requesting a list of USB devices, the controller 10 transmits the name, device class, mode data, and connected host data for each USB device 3 recorded in the connected device table TBL2 to the source of the request based on data in the shared device table TBL1 and connected device table TBL2.

On the other hand, if the data notification request is a detailed data notification request requesting specific shared settings, the controller 10 reads the requested shared settings from the shared device table TBL1 and transmits these settings to the source device. After completing the process in S740 as described above, the controller 10 ends the external request accepting process.

However, if the controller 10 determines in S730 that the external request is not a data notification request (S730: NO), then in S750 the controller 10 determines whether the external request is a settings update request. If the external request is a settings update request (S750: YES), then in S760 the controller 10 updates the targeted shared settings in the shared device table TBL1 specified by the request and based on update data provided in the settings update request, and subsequently ends the external request accepting process. However, if the controller 10 determines in S750 that the external request is not a settings update request (S750: NO), then in S770 the controller 10 executes a process corresponding to this request and subsequently ends the external request accepting process.

Next, a process implemented by a remote device management program 607 loaded in the terminal device 50 will be described. The remote device management program 607 has a function for setting a relation between the USB device 3 and the IP address of the multifunction device 1 connected to the USB device 3 in the USB IP 605 on the terminal device 50 and for facilitating communications between the USB device 3 and the terminal device 50. The remote device management program 607 also has a function for providing a GUI window to the user in order to receive user operations required to access the USB device 3. The controller 60 of the terminal device 50 implements the above function by performing a USB device connection setting process shown in FIGS. 14 and 15 based on the remote device management program 607.

The controller 60 executes a USB device connection setting process when the user performs an operation on the operating unit 75 to display a connection settings window.

Figure 14:
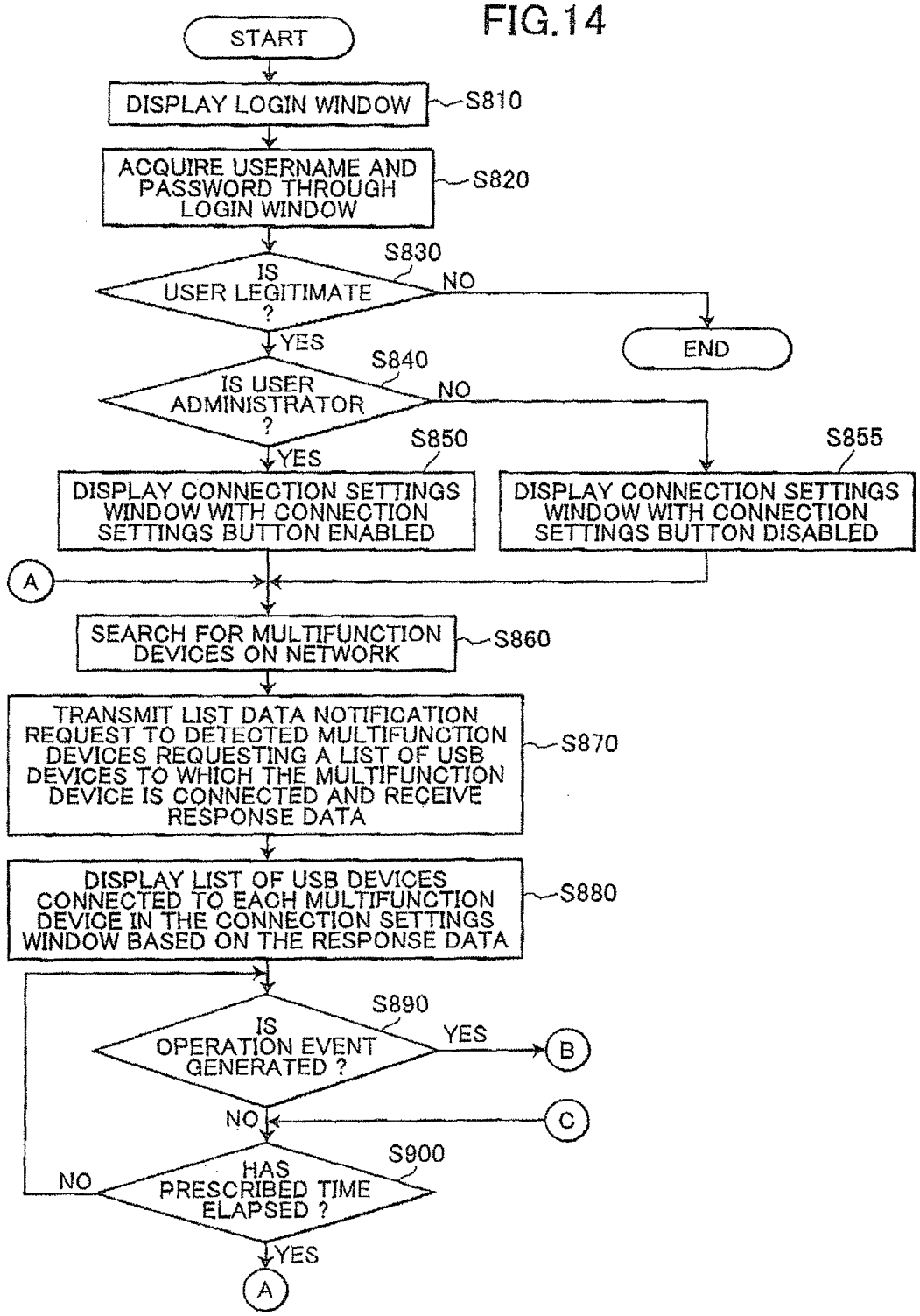
FIGS. 14 and 15 are flowcharts illustrating a USB device connection setting process.
Figure 15:
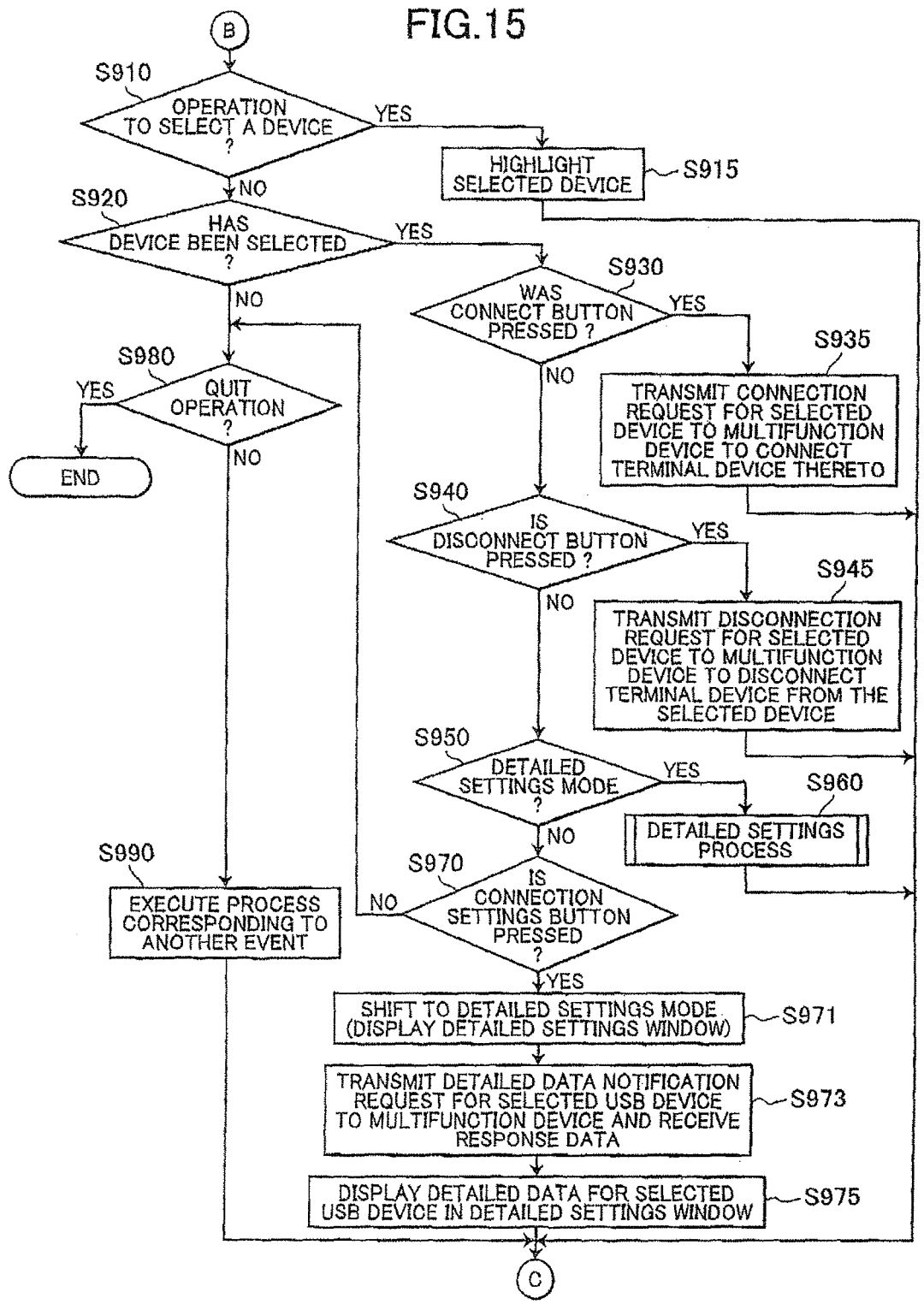

Referring to FIG. 14, at the beginning of the USB device connection setting process in S810, the controller 60 displays a login window on the display unit 73 prompting the user to input a username and password. In S820 the controller 60 acquires the username and password inputted by the user via the operating unit 75. In S830 the controller 60 determines whether the user attempting to log in is a legitimate user based on the username and password. More specifically, the controller 60 determines whether the acquired username and password match the username and password recorded on the terminal device 50. The controller 60 ends the USB device connection setting process if the user is not legitimate (S830: NO) and advances to S840 when the user is determined to be legitimate (S830: YES).

Upon advancing to S840, the controller 60 determines whether the user that logged in is the administrator based on the username registered in the terminal device 50 as the administrator. If the controller 60 determines that the user is the administrator (S840: YES), then in S850 the controller 60 displays the connection settings window (see FIG. 16A) the display unit 73 with a Connection Settings button enabled. However, if the user is not the administrator (S840: NO), then in S855 the controller 60 displays the connection settings window on the display unit 73 with the Connection Settings button disabled.

Figure 16A:
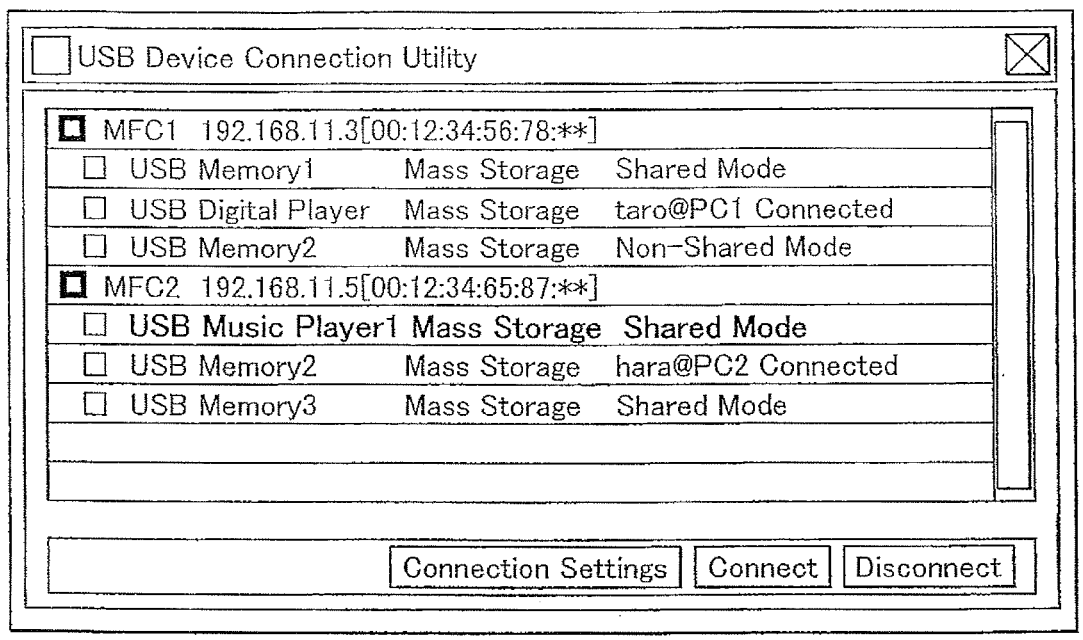
FIGS. 16A and 16B are views showing connection settings windows.

As shown in FIG. 16A, the connection settings window has a list field for displaying a list of the USB devices 3 connected to the multifunction device 1 on the network NT; and the Connection Settings button, a Connect button, and a Disconnect button as input objects. The functions of these buttons are described below in greater detail.

More specifically, in S850 the controller 60 displays the connection settings window with the Connection Settings button enabled by displaying the window with the Connection Settings button functioning as an input object. In S855 the controller 60 displays the connection settings window with the Connection Settings button disabled by displaying the window with the Connection Settings button not functioning as an input object. In the initial stage of displaying the connection settings window in S850 and S855, a list of the USB devices 3 is not displayed in the list field.

After displaying the connection settings window in S850 or S855, in S860 the controller 60 searches for multifunction devices 1 connected to the network NT by broadcasting a device search packet on the network NT and analyzing the response packets. If a plurality of the multifunction devices 1 is connected to the network NT, each multifunction device 1 can be found on the network NT by transmitting the above device search packet.

After completing the search in S860, in S870 the controller 60 transmits a list data notification request to each multifunction device 1 on the network NT found in the above search, requesting a list of the USB devices 3 to which the multifunction device 1 is connected. In response, in S870 the controller 60 receives a list of the connected USB devices 3 from the multifunction device 1 via the network NT. The list of USB devices 3 includes the name, devices class, mode data, and connected host data for each USB device 3.

In S880 the controller 60 controls the display unit 73 to display a list of the names, devices classes, and modes (and connected hosts) for the USB devices 3 connected to each multifunction device 1 in the list field of the connection settings window based on the USB device list, as shown in FIG. 16A.

In S890 the controller 60 determines whether a user operation event has occurred. If an operation event has not occurred (S890: NO), then in S900 the controller 60 determines whether a prescribed time has elapsed since the process of S860 was executed. If the prescribed time has not elapsed (S900: NO), then the controller 60 continues to loop back to S890 until an operation event has occurred or the prescribed time has elapsed. If the prescribed time has elapsed (S900: YES), then the controller 60 returns to S860 and repeats the process from S860 in order to display the latest information on the USB devices 3 in the list field of the connection settings window (S860-S880).

If the controller 60 determines in S890 that an operation event has occurred (S890: YES), then in S910 of FIG. 15 the controller 60 determines whether the user operation inputted via the operating unit 75 is an operation for selecting a device. Specifically, the controller 60 determines whether the user has performed an operation to select one of the USB devices 3 listed in the list field of the connection settings window.

If the controller 60 determines that the user operation is an operation for selecting a USB device 3 (S910: YES), then in S915 the controller 60 highlights the character string corresponding to the selected USB device 3 in the connection settings window. FIG. 16A shows an example of highlighting the character string corresponding to the selected USB device 3 by setting the background of the character string different that of the other entries in the list. Subsequently, the controller 60 returns to S900 in FIG. 14 and waits until another operation event occurs or until the prescribed time has elapsed since executing S860.

However, if the controller 60 determines that the operation event does not correspond to an operation for selecting the USB device 3 (S910: NO), then in S920 the controller 60 determines whether the USB device 3 has already been selected in the connection settings window. Specifically, the controller 60 determines whether a highlighted USB device 3 exists in the connection settings window.

If the USB device 3 has already been selected in the connection settings window (S920: YES), then in S930 the controller 60 determines whether the operation corresponding to the generated event is an operation for pressing the Connect button displayed in the connection settings window.

If the controller 60 determines that the operation event corresponds to an operation to click the Connect button (S930: YES), then in S935 the controller 60 transmits a connection request for the highlighted USB device 3 to the multifunction device 1 connected to this USB device 3 via the network NT in order to allow the terminal device 50 access to the USB device 3. Subsequently, the controller 60 returns to S900.

However, if the controller 60 determines that the operation event does not correspond to an operation for clicking the Connect button (S930: NO), then in S940 the controller 60 determines whether the operation event corresponds to an operation for clicking the Disconnect button provided in the connection settings window. If the operation event corresponds to the Disconnect button (S940: YES), then in S945 the controller 60 transmits a disconnection request for the highlighted USB device 3 to the multifunction device 1 connected to this USB device 3 via the network NT in order to remove the connection between the USB device 3 and the terminal device 50. Subsequently, the controller 60 returns to S900.

However, if the controller 60 determines that the operation event does not correspond to an operation for clicking the Disconnect button (S940: NO), then in S950 the controller 60 determines whether the terminal device 50 has been shifted into the detailed settings mode (described below in greater detail). If the terminal device 50 has been shifted into the detailed settings mode (S950: YES), then in S960 the controller 60 executes a detailed settings process shown in FIG. 17 and subsequently returns to S900.

Figure 16B:
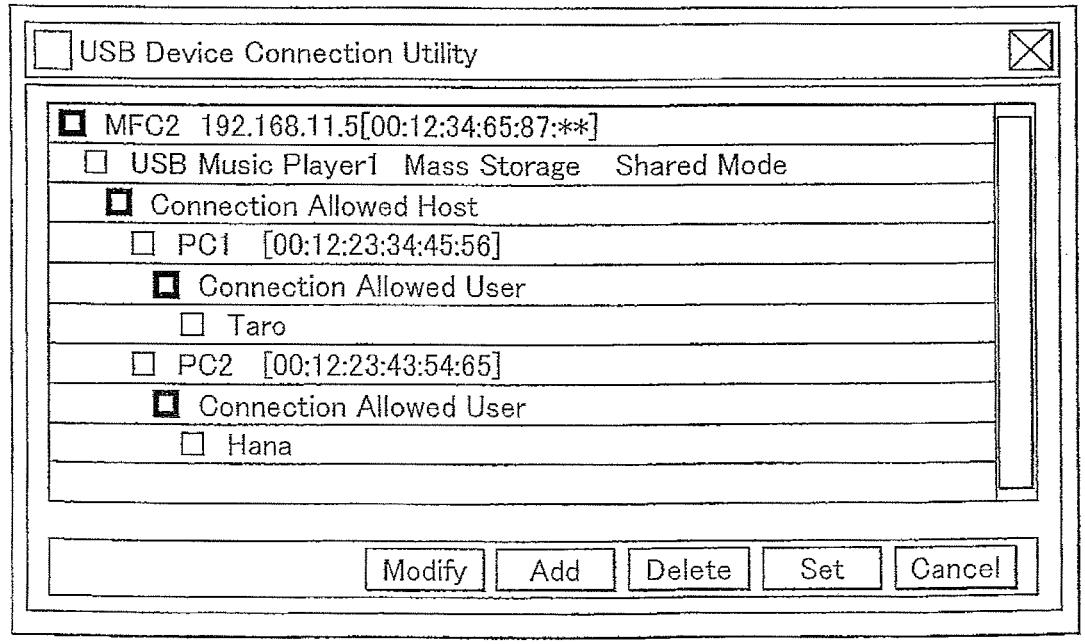

However, if the terminal device 50 has not been shifted into the detailed settings mode (S950: NO), then in S970 the controller 60 determines whether the operation event corresponds to an operation for pressing the Connection Settings button. If the operation event does correspond to an operation for clicking the Connection Settings button (S970: YES), then in S971 the controller 60 shifts the terminal device 50 into the detailed settings mode. More specifically, the controller 60 deactivates the connection settings window and displays a detailed settings window shown in FIG. 16B in the display unit 73 in place of the connection settings window, enabling the user to modify the shared settings corresponding to the USB device 3 that has been highlighted in the connection settings window. However, after completing the process in S971, the connection allowed host and user data is not yet entered in the detailed settings window.

After completing the process in S971, in S973 the controller 60 transmits a detailed data notification request for the highlighted USB device 3 to the multifunction device 1 connected to the corresponding USB device 3 via the network NT requesting shared settings for the USB device 3 and acquires the shared settings from the multifunction device 1. In order to indicate that the detailed data notification request is a legitimate request, the controller 60 transmits the request together with the administrator password.

In S975 the controller 60 displays the mode of the USB device 3 and detailed data for the USB device 3 related to the connection allowed host and user in the detailed settings window based on the shared settings acquired in S973, and subsequently returns to S900. User operations performed in the detailed settings window are received in the detailed settings process of FIG. 17 described later.

However, if the controller 60 determines in S970 that the operation event does not correspond to an operation for clicking the Connection Settings button (S970: NO), then the controller 60 advances to S980. The controller 60 also advances to S980 after determining in S920 that a USB device 3 has not been selected.

In S980 the controller 60 determines whether the operation event corresponds to an operation for closing the connection settings window, i.e. a quit operation. If the controller 60 determines that the operation event is a quit operation (S980: YES), then the controller 60 closes the connection settings window and subsequently ends the USB device connection setting process.

However, if the controller 60 determines that the operation event does not correspond to the quit operation (S980: NO), then in S990 the controller 60 executes another process corresponding to the operation event and subsequently returns to S900.

Figure 17:
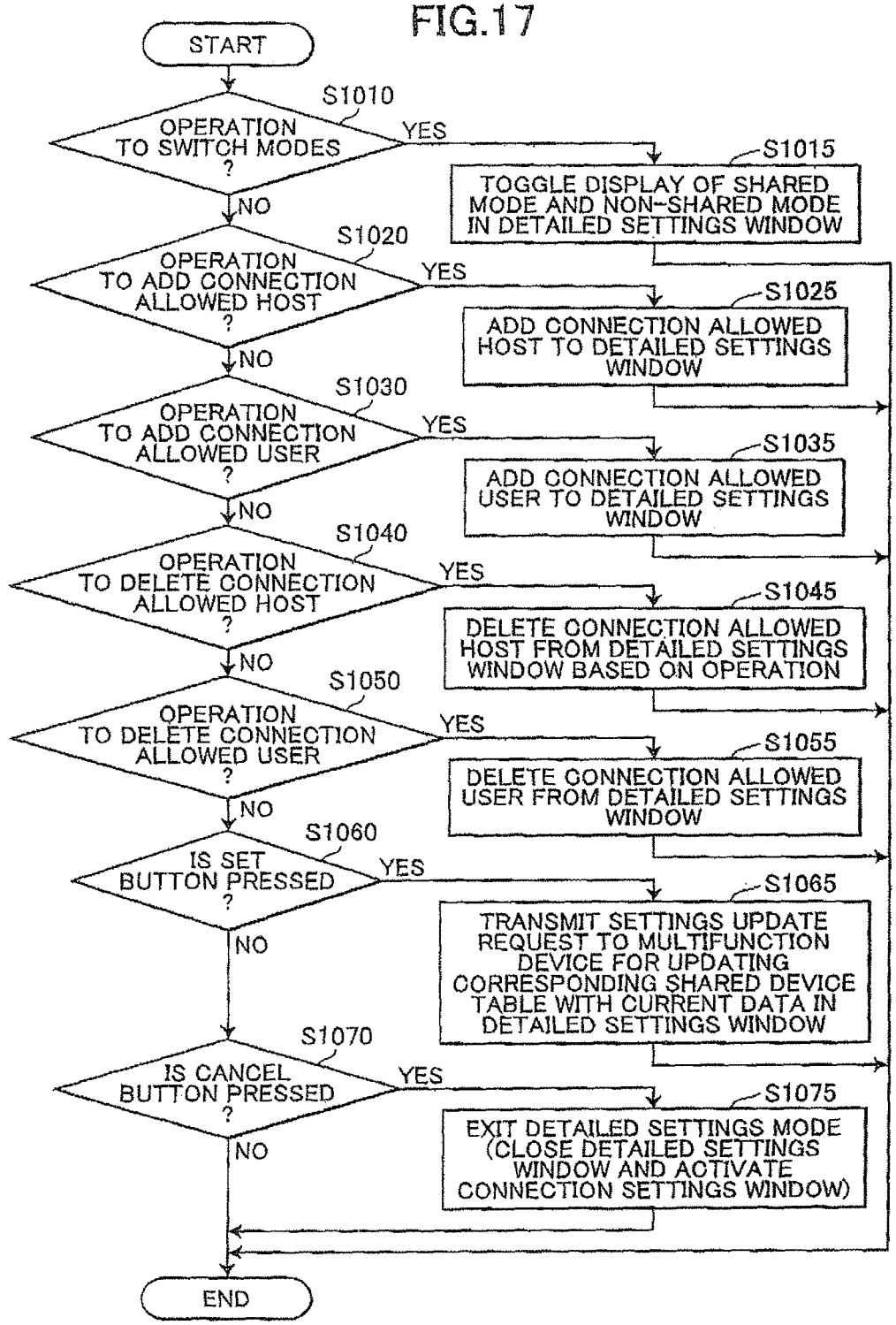
FIG. 17 is a flowchart illustrating a detailed settings process.

Next, the detailed settings process executed in S960 will be described, referring to FIG. 17. At the beginning of the detailed settings process in S1010, the controller 60 determines whether the operation event corresponds to a mode switching operation. If the operation event corresponds to the mode switching operation (S1010: YES), then in S1015 the controller 60 changes the character string for the mode displayed in the detailed settings window from the "non-shared mode" to the "shared mode" or from the "shared mode" to the "non-shared mode." Subsequently, the controller 60 ends the detailed settings process. The mode switching operation is implemented through a series of operations on the operating unit 75; namely, selecting the character string representing the mode in the detailed settings window and pressing a Modify button.

However, if the controller 60 determines that the operation event does not correspond to the mode switching operation (S1010: NO), then in S1020 the controller 60 determines whether the operation event corresponds to an operation for adding a connection allowed host. If the operation event does correspond to an operation for adding a connection allowed host (S1020: YES), then in S1025 the controller 60 adds the host name and MAC address to the detailed settings window for the connection allowed host that the user has inputted via the operating unit 75. Subsequently, the controller 60 ends the detailed settings process. The operation for adding a connection allowed host is implemented by a series of operations on the operating unit 75; namely, selecting the character string of the connection allowed host in the detailed settings window, and clicking on an Add button.

However, if the operation event does not correspond to the operation to add a connection allowed host (S1020: NO), then in S1030 the controller 60 determines whether the operation event corresponds to an operation to add a connection allowed user. If the operation event does correspond to an operation for adding a connection allowed user (S1030: YES), then in S1035 the controller 60 adds the username to the detailed settings window for the connection allowed user that the user has inputted via the operating unit 75. Subsequently, the controller 60 ends the detailed settings process.

The operation for adding a connection allowed user is implemented by a series of operations on the operating unit 75; namely, selecting the character string of the connection allowed user to be added from the display field of connection allowed hosts in the detailed settings window, and clicking the Add button.

However, if the controller 60 determines that the operation event does not correspond to the operation for adding a connection allowed user (S1030: NO), then in S1040 the controller 60 determines whether the operation event corresponds to an operation for deleting a connection allowed host. If the controller 60 determines that the operation event corresponds to an operation for deleting a connection allowed host (S1040: YES), then in S1045 the controller 60 deletes data for the connection allowed host targeted for deletion (host name and MAC address) from the detailed settings window. Subsequently, the controller 60 ends the detailed settings process. The operation for deleting a connection allowed host is implemented through a series of operations that the user performs on the operating unit 75; namely, selecting the character string from the detailed settings window representing the host name of the connection allowed host to be deleted, and clicking a Delete button.

However, if the operation event does not correspond to the operation for deleting a connection allowed host (S1040: NO), then in S1050 the controller 60 determines whether the operation event corresponds to an operation for deleting a connection allowed user. If the operation event does correspond to an operation for deleting a connection allowed user (S1050: YES), then in S1055 the controller 60 deletes data for the connection allowed user targeted for deletion (username) from the detailed settings window. Subsequently, the controller 60 ends the detailed settings process.

The operation for deleting a connection allowed user is implemented by a series of operations; namely, selecting the character string in the detailed settings window representing the username of the connection allowed user targeted for deletion, and clicking on the Delete button.

However, if the operation event does not correspond to the operation for deleting a connection allowed user (S1050: NO), then in S1060 the controller 60 determines whether the operation event corresponds to a clicking operation on a Set button provided in the detailed settings window. If the operation event does correspond to the operation for clicking the Set button (S1060: YES), then in S1065 the controller 60 transmits a settings update request to the multifunction device 1 having shared settings for the update target in order to update the shared settings acquired from the multifunction device 1 in the shared device table TBL1 of the multifunction device 1, so that the shared device table TBL1 matches the current settings displayed in the detailed settings window, and updates the shared settings in the shared device table TBL1 of the multifunction device 1 to data conforming to the current display in the detailed settings window. Subsequently, the controller 60 ends the detailed settings process.

However, if the controller 60 determines that the operation event does not correspond to an operation for clicking the Set button (S1060: NO), then in S1070 the controller 60 determines whether the operation event corresponds to an operation for clicking a Cancel button provided in the detailed settings window. If the operation event does correspond to an operation for clicking the Cancel button (S1070: YES), then in S1075 the controller 60 closes the detailed settings window, exits the detailed settings mode, and activates the connection settings window. Subsequently, the controller 60 ends the detailed settings process. However, if the operation event does not correspond to an operation for clicking the Cancel button in the detailed settings window (S1070: NO), then the controller 60 ends the detailed settings process without executing the process in S1075.

Accordingly, the shared settings in the multifunction device 1 can be updated by remote operations received from the terminal device 50 via the network NT.

With the above configurations of the multifunction device 1 and the terminal device 50, the USB driver 103b of the multifunction device 1 controls USB devices 3 in the non-shared mode by generating USB data for controlling the USB devices 3 connected to the USB interface based on commands inputted from an application program installed on the multifunction device 1 and inputs this USB data into the USB host control driver 105. The USB host control driver 105 controls the USB host controller 31 to convert USB data for the USB device 3 into signals and to transmit this data to the corresponding USB device 3.

On the other hand, when controlling USB devices 3 in the shared mode, the USB IP 101 of the multifunction device 1 extracts USB data addressed to the connected USB device 3 from an IP packet received via the LAN interface 35. Next, the device bridge 103a inputs this USB data into the USB host control driver 105, and the USB host control driver 105 transmits the USB data to the corresponding USB device 3.

Hence, the multifunction device 1 directly operates the USB device 3 according to a command from an internal application without the network NT, and accepts remote operations to the USB device 3 from a terminal device 50 on the network NT using the USB IP 101.

Hence, with the multifunction device 1, an internal application program can effectively use the USB device 3 without requiring the multifunction device 1 to generate an IP packet with the USB data.

The multifunction device 1 constructs a control system using the USB driver 103b to control the USB device 3 based on commands received from an internal application program and constructs a control system using the USB IP 101 and device bridge 103a to process USB data received from the terminal device 50 over the network NT for controlling the USB device 3. In order to avoid complex control of the USB devices 3, the multifunction device 1 is configured to switch the two control systems so that both are not activated simultaneously.

Hence, the multifunction device 1 can switch the control system for each USB device 3 by loading either one of the USB driver 103b and device bridge 103a based on user specifications included in the shared settings. Therefore, each USB device 3 can be controlled in either a non-shared mode for controlling the USB device 3 internally or a shared mode for controlling the USB device 3 via a network.

By avoiding complex control procedures for the USB devices 3, the multifunction device 1 implements a system capable of controlling the USB devices 3 from both of the internal application program and the terminal device 50 on a network NY by means of a relatively simple structure.

The multifunction device 1 is also configured to store shared settings including a mode setting in the EEPROM 17 in a rewritable form based on user instructions so that the user can easily switch between the shared mode and the non-shared mode. Therefore, the user can activate either the internal control function or the USB device server function as needed.

The multifunction device 1 provides shared settings for each USB device, enabling the user to specify the shared mode or the non-shared mode for each USB device individually. Hence, the multifunction device 1 is highly convenient by enabling the user to suitably activate the internal control function or the USB device server function for each USB device as required.

The multifunction device 1 can issue mode data for each USB device to terminal devices on the network as needed. Hence, users of terminal devices can easily acquire mode data for each USB device 3 through the terminal device 50.

When the new USB device 3 not previously connected to the USB interface and not having shared settings recorded in the shared device table TBL1 is connected to the USB interface for the first time, a control system is constructed for the USB device 3 and the mode setting of the USB device 3 is set to the non-shared mode as the default value, so as not to allow access to the USB device 3 via the network NT. Here, it is not preferable to set the default value to a new USB device 3 to the shared mode from a security point of view, since a terminal device 50 on the network NT would be able to access the USB device 3 immediately after the USB device 3 is newly connected to the multifunction device 1.

By setting the new USB device 3 to the non-shared mode, the USB device 3 cannot initially be accessed by a terminal device 50 on the network NT, thereby preventing the problems described above.

Figures 18, 20:
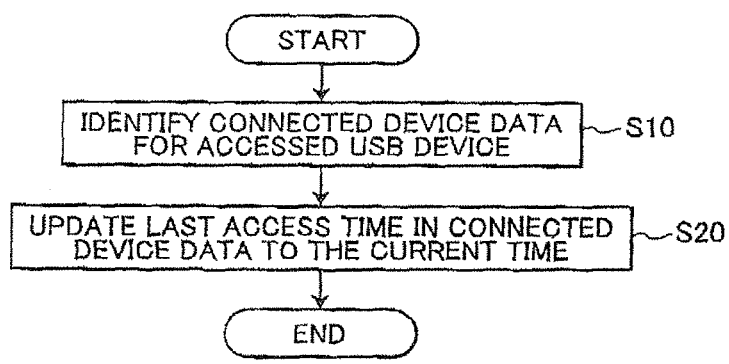
FIG. 18 is a flowchart illustrating a last access time updating process.
FIG. 20 shows a content updating table TBL stored in the EEPROM.

The USB management program 107 may have a function for updating the last access time specified in each connected device data entry in the connected device table TBL2. The controller 10 implements this function in a last access time updating process executed based on the USB management program 107. As shown in FIG. 18, the controller 10 executes the last access time updating process whenever the USB device 3 is accessed for reading or writing data.

At the beginning of the last access time updating process in S10, the controller 10 identifies the connected device data in the connected device table TBL2 for the USB device 3 that has been accessed. In S20 the controller 10 updates the last access time listed in the connected device data for the accessed USB device 3 to the current time, and subsequently ends the last access time updating process. By executing this process, the controller 10 continuously updates the last access time in the connected device data for each USB device 3.

In another embodiment, the multifunction device 1 has the content collection function. Next, processes related to the content collecting function will be described.

The content collection program 109 is installed to the controller 10 for implementing the content collecting function. Specifically, the controller 10 implements the function by executing the process shown in FIG. 19 based on the content collection program 109. In particular, the content collecting function is implemented by a content updating management process including a content updating process, as shown in FIG. 19.

At the beginning of the content updating management process in S1610, the controller 10 initializes a reference number k to 0. In S1620 the controller 10 determines whether the reference number k is greater than a maximum value M for index numbers which has been registered in the content updating data. The content updating data is recorded in a content updating table TBL3 (see FIG. 20) stored in the EEPROM 17. If the reference number k is greater than the maximum value M (S1620: YES), the controller 10 ends the content updating management process. However, if the controller 10 determines that the reference number k is less than or equal to the maximum value M (S1620: NO), then the controller 10 advances to S1630.

Referring to FIG. 20, the content updating table TBL3 includes URLs for RSS data provided on the server SV targeted for content acquisition. The content updating table TBL3 is generated in the EEPROM 17 when the first URL is recorded. Accordingly, the content updating management process is executed after the content updating table TBL3 is generated.

As shown in FIG. 20, the content updating table TBL3 has content updating data for each URL targeted for RSS data acquisition. The content updating data includes a device ID representing the write destination USB device for RSS distributed content, the URL for acquiring the RSS data, the last update time indicating the last time at which RSS distributed content has been acquired and written to the write destination USB device, and a next update time indicating the next time for acquiring RSS distributed content and writing this content to the write destination USB device 3. The index numbers for the content updating data in the content updating table TBL3 begin from the value "0" and are assigned to the content updating data in the order that they are recorded in the content updating table TBL3. In this embodiment, the write destination USB device 3 is one of the USB device 3 connected to the multifunction device 1 directly through the USB port CN.

Further, the content updating data is recorded in the content updating table TBL3 based on user instructions. At this time, the content updating data is created and recorded in the content updating table TBL3, with null values for the last update time and the next update time.

If the controller 10 determines that the reference number k is less than or equal to the maximum value M when referencing the content updating table TBL3 having the above construction (S1620: NO), this indicates that there exists content updating data in the content updating table TBL3 that has not been properly updated under the content collection program 109. Accordingly, in S1630 the controller 10 reads the content updating data for the index number k matching the reference number k in the content updating table TBL3.

In S1640 the controller 10 determines whether the current time has reached or passed the next update time indicated in the content updating data for the index number k. If the current time has reached or passed the next update time (S1640: YES), the controller 10 advances to S1645. If not (S1640: NO), the controller 10 advances to S1780.

In S1645 the controller 10 determines whether the write destination USB device 3 of content corresponding to the device ID indicated in the content updating data for the index number k is connected to the USB port CN. If the write destination USB device 3 is connected to the USB port CN (S1645: YES), the controller 10 advances to S1650. If not (S1645: NO), the controller advances to S1780. The controller 10 makes this determination in S1650 by determining whether connected device data for the write destination USB device 3 is recorded in the connected device table TBL2.

In S1650 the controller 10 determines whether the write destination USB device 3 corresponding to the device ID in the content updating data for index number k is occupied by any terminal device 50 on the network NT. Specifically, the controller 10 references the connected device table TBL2 to determine whether a MAC address of a connected host (terminal device 50) is recorded in the connected host data for the write destination USB device 3.

If the controller 10 determines that the write destination USB device 3 is not occupied by a terminal device 50 on the network NT (S1650: NO), then in S1660 the controller 10 determines whether the write destination USB device 3 is occupied by the multifunction device 1 itself. In other words, the controller 10 determines whether the internal control function has been activated for the write destination USB device 3.

If the write destination USB device 3 is occupied by the multifunction device 1 itself (S1660: YES), then in S1700 the controller 10 executes the content updating process shown in FIG. 21 to acquire content from the server SV on the Internet and to write this content to the write destination USB device 3. Particularly, the write destination USB device 3 is a portable music player 40 which reproduces music or videos and/or displays still images and text documents. After completing the process in S1700, the controller 10 advances to S1780.

However, if the controller 10 determines in S1660 that the write destination USB device 3 is not occupied by the multifunction device 1 itself (S1660: NO), then in S1670 the controller 10 loads the USB driver 103b corresponding to the write destination USB device 3 to construct the control system shown in FIG. 2B and operationally connects the write destination USB device 3 to the multifunction device 1 directly so that the content collection program 109 can access the write destination USB device 3 without the network NT.

In S1680 the controller 10 executes the content updating process shown in FIG. 21 to acquire content from the server SV on the Internet and to write the content to the write destination USB device 3.

After completing the content updating process in S1680, in S1690 the controller 10 unloads the USB driver 103b, canceling the control system for the write destination USB device 3, and operationally disconnects the write destination USB device 3 from the multifunction device 1. After completing this process, the controller 10 advances to S1780.

If the controller 10 determines in S1650 that the write destination USB device 3 is occupied by any terminal device 50 on the network NT (S1650: YES), then in S1710 the controller 10 determines whether a prescribed time has elapsed since the last access time indicated in the connected device data for the write destination USB device 3. If the prescribed time has not elapsed (S1710: NO), the controller 10 advances to S1780.

However, if the prescribed time has elapsed (S1710: YES), then in S1720 the controller 10 sets the MAC address of the connected host currently occupying the write destination USB device 3 as a MAC address for the previously connected host, and writes this MAC address to the connected device data for the write destination USB device 3.

In S1730 the controller 10 unloads the device bridge 103a for the write destination USB device 3, temporarily canceling the control system for the write destination USB device 3 and operationally disconnecting the write destination USB device 3 from the connected host. Subsequently, the controller 10 advances to S1740.

In S1740 the controller 10 loads the USB driver 103b corresponding to the write destination USB device 3, constructing the control system for the write destination USB device 3 shown in FIG. 2B and operationally connecting the write destination USB device 3 to the multifunction device 1 for the content collecting function.

In S1750 the controller 10 executes the content updating process shown in FIG. 21 to acquire content from the server SV on the Internet and to write this content to the write destination USB device 3. After completing the process in S1750, in S1760 the controller unloads the USB driver 103b, operationally disconnecting the write destination USB device from the multifunction device 1, thereby freeing the write destination USB device 3.

In S1770 the controller 10 loads the device bridge 103a for the write destination USB device 3, operationally reconnecting the previously connected host to the write destination USB device 3. Subsequently, the controller 10 advances to S1780.

In S1780 the controller 10 increments the reference number k by 1 and returns to S1620. In S1620 the controller 10 determines whether the reference number k is greater than the maximum value M. If the reference number k is greater than the maximum value M (S1620: YES), the controller 10 ends the content updating management process. However, if the reference number k is less than or equal to the maximum value M (S1620: NO), then in S1630 the controller 10 reads the content updating data for the index number k corresponding to the new reference number k incremented in S1780 and repeats the process from S1640.

During the content updating management process described above, the controller 10 executes a content updating process described below in steps S1680, S1700, and S1750. Referring to FIG. 21, at the beginning of the content updating process in S1810, the controller 10 acquires RSS data from the server SV via the network NT. The RSS data corresponds to a URL for the RSS data indicated in the content updating data for the index number k.

In S1820 the controller 10 determines whether all ITEM elements constituting the RSS data have undergone the process beginning from S1830. If the process from S1830 has not been performed on all ITEM elements (S1820: NO), then in S1830 the controller 10 selects an unprocessed ITEM element as the process target, in S1840 interprets the selected ITEM element, and in S1850 determines whether the distributed content corresponding to the ITEM element is video or audio content. The controller 10 can determine whether the distributed content is video or audio content based on whether the ITEM element includes an enclosure element.

If the controller 10 determines that the distributed content corresponding to the ITEM element is video or audio content (S1850: YES), then in S1860 the controller 10 acquires the video or audio content from the URL specified for this content in the ITEM element. In S1865 the controller 10 writes the acquired content to the storage unit 40a of the write destination USB device 3. FIG. 22 shows an example of RSS data having an ITEM element whose distributed content is audio content.

After completing the process in S1865, the controller 10 returns to S1820 and again determines whether all ITEM elements constituting the RSS data have been processed. The controller 10 advances to S1900 if all ITEM elements have been processed (S1820: YES) and advances to S1830 if there exist any ITEM elements that have not been processed (S1820: NO).

Further, if the controller 10 determines in S1850 that the distributed content corresponding to the selected ITEM element is not video or audio content (S1850: NO), then in S1880 the controller 10 generates image data for printing (print data) that represents an abstract of the distributed content. The print data is generated based on a title element and a description element included in the ITEM element; and a title element, description element, copyright element, and pubDate element included under the channel element of the RSS data. The lower section in FIG. 23 shows an example of print data generated in S1880 when the RSS data is configured as shown in the upper section of FIG. 23.

After completing the process in S1880, in S1885 the controller 10 prints the image data generated in S1880. In S1890 the controller 10 generates display data representing an abstract of the distributed content similar to the print data generated in S1880 and based on the same title element and description element in the ITEM element; and the title element, description element, copyright element, and pubDate element under the channel element of the RSS data. The display data generated in S1890 is used to display an abstract of the content on a display screen of the write destination USB device.

In S1895 the controller 10 writes the display data generated in S1890 to the storage unit 40a of the write destination USB device 3 and subsequently returns to S1820. In S1820 the controller 10 again determines whether all ITEM elements constituting the RSS data have been processed. If all ITEM elements have been processed (S1820: YES), the controller 10 advances to S1900.

When advancing to S1900, the controller 10 sets the last update time in the content updating data corresponding to the index number k in the content updating table TBL3 to the current time, sets the next update time to a future time computed by adding a length of time indicated in the ttl element of the RSS data to the current time, and updates the content updating data for the index number k. As is well known in the art, the time indicated by the ttl element in the RSS data represents the valid period of the article indicated by the RSS data. In this embodiment, the multifunction device 1 effectively checks RSS data by setting the next update time to an elapsed time corresponding to the time length indicated in the ttl element. After completing the process in S1900, the controller 10 ends the content updating process.

In the multifunction device 1, the controller selectively activates the USB device server function and the internal control function for each USB device 3 based on mode settings representing a user-specified mode and a connection request.

The USB device server function transmits USB data (control data for the USB device 3) inputted via the LAN interface 35 from a terminal device on the network NT to the USB device 3 via the USB host controller 31 in order to control the USB device 3 based on commands from the terminal device 50 on the network NT. The internal control function controls the USB device 3 via the USB host controller 31 based on commands from a main processor within the multifunction device 1 itself (an application program).

Based on the content collection program 109 in the multifunction device 1, the controller 10 acquires content from the server SV through the LAN interface 35 and stores this content in the music player 40 connected to the multifunction device 1. When writing content acquired with the content collection program 109 to the music player 40, the controller 10 also determines whether the music player 40 is occupied by the terminal device 50 on the network NT. If the music player 40 is occupied by the terminal device 50 on the network NT, the controller 10 operationally disconnects the terminal device 50 from the music player 40, and establishes an operational connection between the multifunction device 1 and the music player 40 to construct a control system between the content collection program 109 and the music player 40, thereby enabling the content collection program 109 to write collected content to the music player 40.

Hence, the multifunction device 1 can continually store content acquired from the server SV in the music player 40, even when the terminal device 50 on the network NT occupies the music player 40 for a long period of time.

Further, immediately after content collected by the content collection program 109 has been written to the music player 40, the controller 10 operationally disconnects the music player 40 from the multifunction device 1, and operationally reconnects the previously connected terminal device 50 to the music player 40, thereby restoring the control system for the USB device 3 modified for the content collection program 109 to its original state. Accordingly, the multifunction device 1 can temporarily allocate the music player 40 to the content collection program 109 in order to store content on the music player 40 without affecting the terminal device 50 on the network NT.

In some cases, content may be collected from the server SV intermittently due to a large number of RSS URLs recorded in the content updating table TBL3. If the terminal device on the network NT is operationally disconnected from the USB device 3 each time in this case, the USB device 3 may become non-user-friendly to the terminal device 50. Therefore, in this embodiment, the controller 10 determines whether a prescribed time has elapsed since the write destination USB device 3 for writing content has been accessed when the content acquisition timing arrives. If the prescribed time has not elapsed, then the controller 10 refrains from writing content, and does not operationally disconnect the terminal device 50 from the USB device 3.

In other words, if the terminal device 50 on the network NT is actually and effectively using the USB device 3 when the timing for acquiring content arrives, the connection between the terminal device 50 and the USB device 3 is given priority. Hence, content can be appropriately stored in the music player 40 without affecting the terminal device 50 on the network NT, even when the content acquisition timing arrives intermittently.

For example, if the terminal device 50 on the network NT attempts to execute a prescribed process with the USB device 3 over a lengthy time interval, the terminal device 50 may not be able to implement the above process if the terminal device 50 is operationally disconnected from the USB device 3 each time the content acquisition timing arrives. However, this problem does not occur since the content is appropriately stored in the music player 40 without greatly affecting the terminal device 50.

However, if the terminal device 50 on the network NT is simply occupying the USB device 3 without effectively using the same, the multifunction device 1 operationally disconnects the terminal device 50 in order to write content to the USB device 3. Therefore, the content collection program 109 can effectively use the USB device 3 if necessary.

Further, if operations to operationally disconnect the terminal device 50 from the USB device 3 and to restore the operational connection thereof are frequently performed due to the content acquisition timing arriving frequently, the processing time for switching the connection increases, thereby increasing the time in which neither the content collection program 109 nor the terminal device 50 can use the music player 40. Therefore, when the multifunction device 1 itself occupies the music player 40 in order to write content to the same, it is possible to keep the music player 40 connected to the multifunction device 1 for a period of time, as described next in the first modification of the embodiment.

Figure 24:
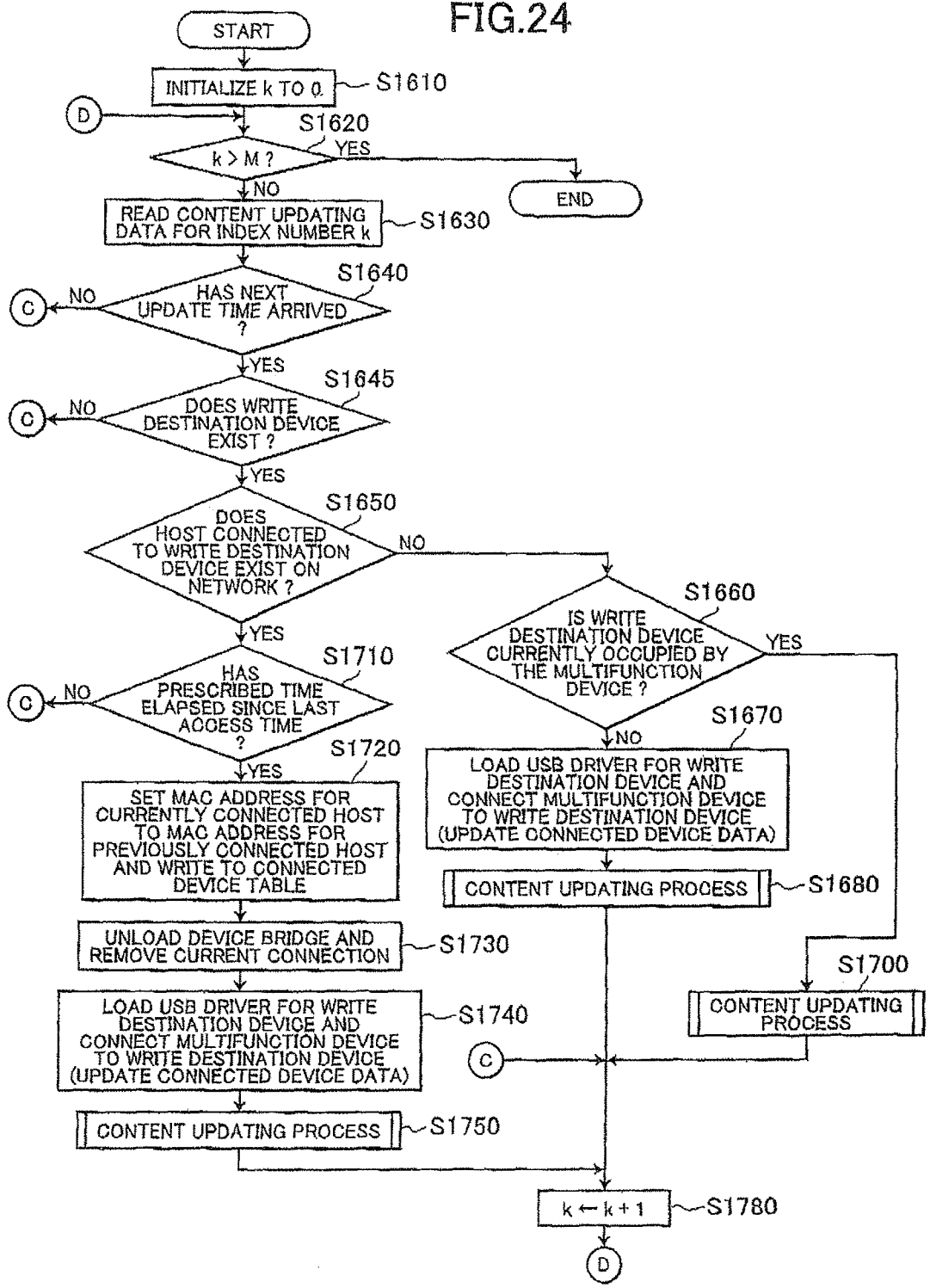
FIG. 24 is a flowchart illustrating a content updating management process.

Referring to FIG. 24, the controller 10 of a multifunction device 1 according to a first modification repeatedly executes a content updating management process in place of the content updating management process shown in FIG. 19.

Figure 25:
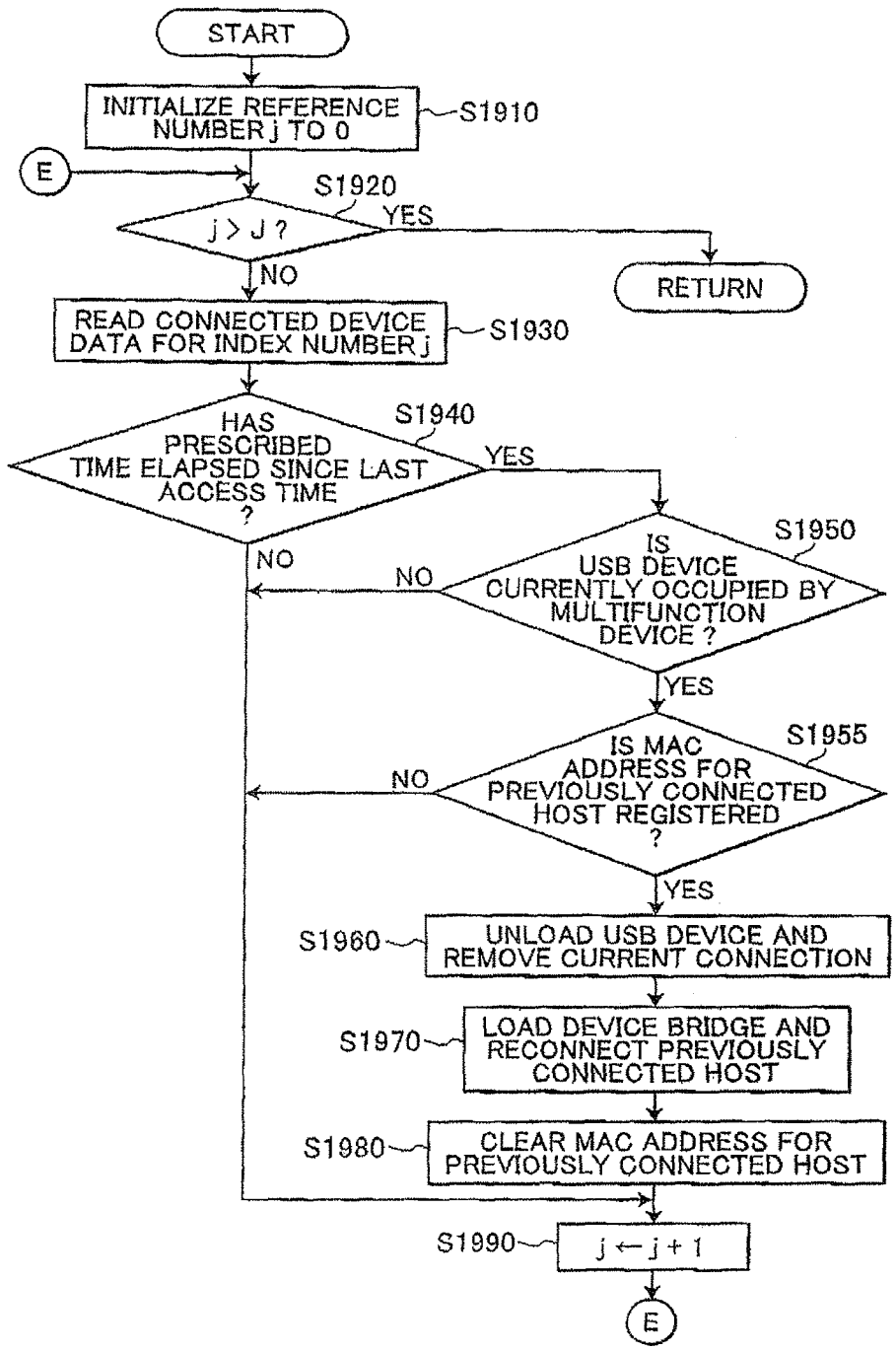
FIG. 25 is a flowchart illustrating a connection time management process.

The multifunction device 1 has the same structure, differing only in the content updating management process shown in FIG. 24 and the connection time management process shown in FIG. 25 executed by the controller 10. Below the content updating management process and the connection time management process executed by the controller 10 will be selectively described while referring to FIGS. 24 and 25.

As shown in FIG. 24, the content updating management process is similar to the process shown in FIG. 19, excluding the steps S1690, S1760, and S1770. In other words, after the controller 10 loads the USB driver 103b for the write destination USB device 3, operationally connecting the multifunction device 1 to the write destination USB device 3 in order to write content to the same (S1670, S1740), the controller 10 maintains this operational connection when advancing to S1780 and executing the subsequent processes. Except for this point, the details of the content updating management process shown in FIG. 24 are identical to those in the process shown in FIG. 19. Therefore, steps in FIG. 24 that are identical to those in FIG. 19 have been designated with the same step numbers and a detailed description of these steps has been omitted.

Next, the connection time management process repeatedly executed by the controller 10 will be described. This process functions to cancel the operational connection between the multifunction device 1 and the write destination USB device 3 established in the content updating management process.

At the beginning of the connection time management process in S1910 of FIG. 25, the controller 10 initializes a reference number j to "0". In S1920 the controller 10 determines whether the reference number j is greater than a maximum value J of index numbers for connected device data recorded in the connected device table TBL2 (see FIG. 7). If the reference number j is greater than the maximum value J (S1920: YES), then the controller 10 ends the connection time management process. However, if the reference number j is less than or equal to the maximum value J (S1920: NO), the controller 10 advances to S1930.

In S1930 the controller 10 reads connected device data for an index number j matching the reference number j in the connected device table TBL2. In S1940 the controller 10 determines whether a prescribed time or greater has elapsed since the last access time indicated in the connected device data for the index number j based on the current time.

The controller 10 advances to S1950 if the prescribed time or greater has elapsed since the last access time (S1940: YES) and advances to S1990 if the prescribed time has not elapsed (S1940: NO).

When advancing to S1950, the controller 10 determines whether the multifunction device 1 is occupying the write destination USB device 3. In other words, the controller 10 determines whether the internal control function has been activated for the write destination USB device 3.

The controller 10 advances to S1955 if the multifunction device 1 is occupying the write destination USB device 3 (S1950: YES) and advances to S1990 if the multifunction device 1 is not occupying the write destination USB device 3 (S1950: NO).

When advancing to S1955, the controller 10 determines whether the MAC address for the previously connected host (terminal device 50 on the network NT) is recorded in the connected device data corresponding to the index number j. The controller 10 advances to S1960 if the MAC address for the previously connected host is recorded in the connected device data (S1955: YES) and advances to S1990 if the MAC address for the previously connected host is not recorded (S1955: NO).

When advancing to S1960, the controller 10 unloads the USB driver 103b corresponding to the write destination USB device 3 to operationally disconnect the write destination USB device 3 from the multifunction device 1. In S1970 the controller 10 loads the device bridge 103a corresponding to the write destination USB device 3 to construct a control system for the USB device with the device bridge 103a, operationally reconnecting the previously connected host (terminal device 50) to the write destination USB device 3. In S1980 the controller 10 removes the MAC address for the previously connected host in the connected device data in connected device table TBL2 corresponding to the index number j, and subsequently advances to S1990. After advancing to S1990, the controller 10 increments the reference number j by 1 and subsequently repeats the process from S1920 using the new reference number j.

According to the connection time management process shown in FIG. 25, if the USB device 3 remains in an unused state for a prescribed time or greater after the operational connection has been switched from the terminal device 50 on the network NT to the multifunction device 1 in the content updating management process, the multifunction device 1 disconnects the internal application from the USB device 3 and reestablishes the operational connection between the terminal device 50 on the network NT and the USB device 3. In other words, the multifunction device 1 occupies the USB device 3 until a prescribed time or greater has elapsed while the USB device 3 is an unused state.

Hence, the multifunction device 1 prevents the control system from being switched frequently when the content acquisition timing arrives frequently and intermittently, which can increase the processing time required for switching, thereby reducing a drop in user-friendliness for the USB device 3 resulting from an increase in the time during which neither the multifunction device 1 nor the terminal device 50 on the network NT can use the USB device 3.

While the multifunction device 1 does not remove the operational connection between the multifunction device 1 and the USB device 3 established in S1670 of the content updating management process, the controller 10 can remove this connection in the connection time management process of FIG. 25 if a connection request is received from the network after a prescribed time has elapsed since the USB device 3 has been accessed, for example.

In another embodiment, the music player 40 may have the content updating data in the storage 40a so that any multifunction device 1 can read the content updating data when the music player 40 is connected to the multifunction device 1. In this case, when the music player 40 is connected to the multifunction device 1, the multifunction device 1 is configured to read the content updating data from the music player 40, acquire content from the server SV based on this data, and write this content to the music player 40.

The music player 40 connected to the multifunction device 1 has a content updating data table TBL4 stored in the storage unit 40a. The multifunction device 1 generates content updating data for content desired by the user based on user operations and records this data in the content updating data table TBL4.

The content updating data table TBL4 has content updating data for each RSS URL, similar to the content updating table TBL3 that the multifunction device 1 stores in the EEPROM 17. The content updating data is configured of URLs indicating the destinations for acquiring RSS data, the last update time for the content, and the next update time.

Figure 26:
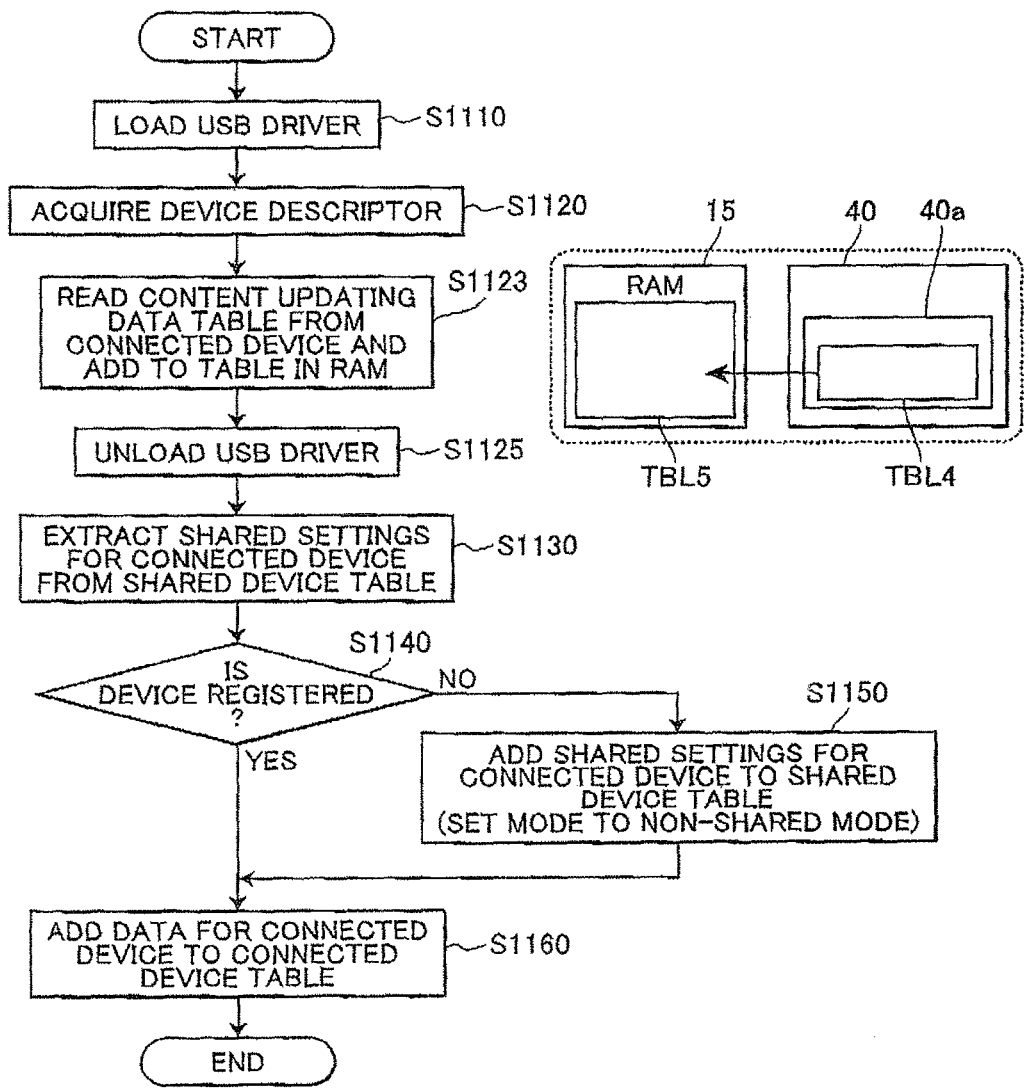
FIG. 26 is a flowchart illustrating a connection accepting process.

The multifunction device 1 reads the content updating data table TBL4 from the music player 40 in the connection accepting process shown in FIG. 26. Subsequently, the multifunction device 1 acquires content from the server SV based on data in the content updating data table TBL4 and writes this acquired content to the music player 40.

Specifically, the controller 10 of the multifunction device 1 begins the connection accepting process shown in FIG. 26 when the USB device 3 is connected to the USB port CN. At the beginning of the connection accepting process in S1110, the controller 10 loads the USB driver 103a. In S1120 the controller 10 acquires a device descriptor from the USB device 3 connected to the USB port CN.

In S1123 the controller 10 reads the content updating data table TBL4 from the USB device 3 connected to the USB port CN and records the read data from the content updating data table TBL4 in the content updating data table TBL5 in the RAM 15. Subsequently, the controller 10 advances to S1125.

In this embodiment, the controller 10 performs an operation when the multifunction device 1 is started for adding the content updating table TBL3 from the EEPROM 17 to the tbl5 in the RAM 15.

As shown in FIG. 27B, the music player 40 is configured as a composite of the content updating table TBL3 and content updating data table TBL4 with table acquisition source data added for each entry. Specifically, the controller 10 performs an operation when the multifunction device 1 is started for writing the content updating table TBL3 in the EEPROM 17 to the RAM 15 together with a table acquisition source value of "−1", generating the content updating data table TBL5 in the RAM 15. The table acquisition source data is a device ID for the table acquisition source device. In FIG. 27B a value of "−1" for the table acquisition source indicates that the multifunction device 1 is the source; a value of "0" indicates that the source is a USB device 3 currently connected to the multifunction device 1 with a device ID of "0"; and a value of "1" indicates that the source is a USB device 3 currently connected to the multifunction device 1 with a device ID of "1".

Specifically, in S1123 the controller 10 adds data representing the write destination USB device 3 for writing content and a device ID of the USB device 3 as table acquisition source data to the content updating data table TBL4 read from the connected USB device 3 (the music player 40) and adds this data to the content updating data table TBL5 in the RAM 15 in order to record the content updating data table TBL4 in the content updating data table TBL5. At this time, a sequential index number is also attached to each entry of the content updating data added to the content updating data table TBL5.

However, in S1123 the controller 10 reads the content updating data table TBL4 from the USB device 3 and records this data in the content updating data table TBL5 stored in the RAM 15 only when the connected USB device 3 has a content updating data table TBL4, i.e. when the USB device 3 is the music player 40. In other words, if the connected USB device 3 is not the music player 40, the controller 10 essentially advances to S1125 without executing the process in S123.

In S1125 the controller 10 unloads the USB driver and subsequently executes the process in S1130-S1160 which are the same steps S130-S160 of FIG. 6. After completing S1160, the controller 10 ends the connection accepting process. Through the connection accepting process of FIG. 26, the multifunction device 1 imports the content updating data table TBL4 from the music player 40 connected to the multifunction device 1.

Figure 28A:
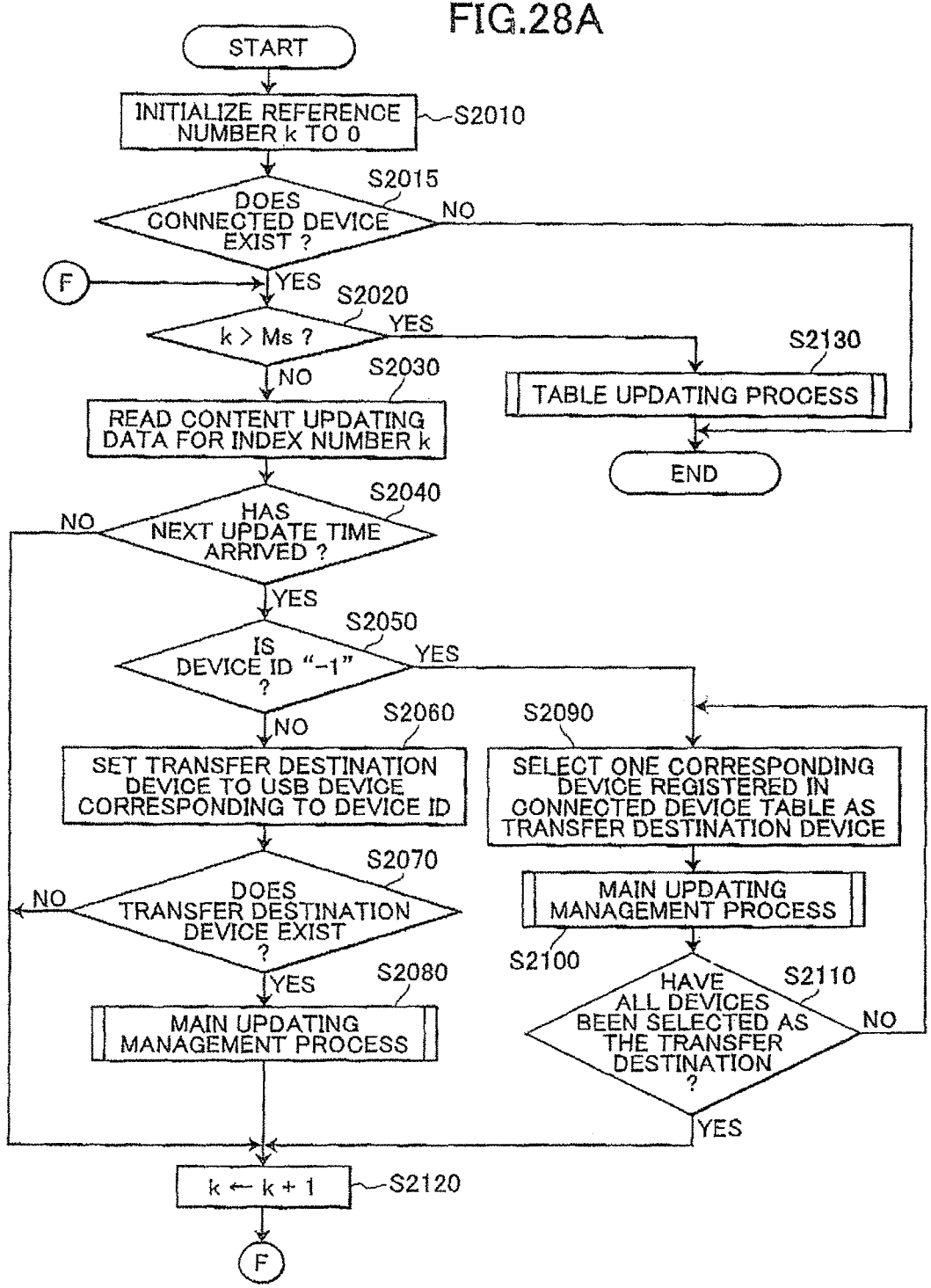

In this case, the multifunction device 1 implements the content collecting function by executing the content updating management process shown in FIG. 28A. In this process, the multifunction device 1 acquires content based on the content updating data table TBL4 imported from the music player 40 and writes this content to the corresponding music player 40. The controller 10 executes the content updating management process shown in FIG. 28 repeatedly at prescribed intervals.

At the beginning of the content updating management process in S2010, the controller 10 initializes the reference number k to "0". In S2015 the controller 10 determines whether a USB device 3 is connected to the USB port CN. If no USB device 3 is connected to the USB port CN (S2015: NO), then the controller 10 ends the content updating management process. However, when a USB device 3 is connected to the USB port CN (S2015: YES), the controller 10 advances to S2020.

In S2020 the controller 10 references the content updating data table TBL5 in the RAM 15 to determine whether the reference number k is greater than a maximum number Ms of index numbers for content updating data in the content updating data table TBL5. The controller 10 advances to S2130 if the reference number k is greater than the maximum number Ms (S2020: YES) and advances to S2030 if the reference number k is less than or equal to the maximum number Ms (S2020: NO).

When advancing to S2030, the controller 10 reads content updating data for an index number k matching the reference number k from the content updating data table TBL5. In S2040 the controller 10 determines whether the current time matches or surpasses the next update time indicated in the content updating data. The controller 10 advances to S2050 if the current time indicates that the next update time has arrived (S2040: YES) and advances to S2120 if the next update time has not yet arrived (S2040: NO).

When advancing to S2050, the controller 10 determines whether the device ID for the write destination USB device 3 indicated in the content updating data for the index number k is −1".

The multifunction device 1 may also be configured to accept a user specification for all music players 40 as the write destination for content. When all music players 40 are specified, the multifunction device 1 is configured to record content updating data including the value of "−1" representing the device ID for the write destination USB device 3 in the content updating table TBL3. In S2050 the controller 10 determines whether the content updating data for the index number k is this type of content updating data.

The controller 10 advances to S2090 upon determining that the device ID for the write destination USB device 3 is the value "−1" in the content updating data for index number k (S2050: YES), and advances to S2060 if the device ID is not "−1" (S2050: NO).

When advancing to S2060 the controller 10 sets a transfer destination USB device as the write destination USB device indicated in the content updating data for the index number k. In S2070 the controller 10 determines whether the transfer destination USB device 3 is physically connected to the USB port CN. The controller 10 advances to S2080 if the transfer destination USB device 3 is physically connected to the USB port CN (S2070: YES) and advances to S2120 if the transfer destination USB device 3 is not physically connected to the USB port CN (S2070: NO). Specifically, in S2070 the controller 10 determines whether the transfer destination USB device 3 is connected to the USB port CN based on whether connected device data for the transfer destination USB device has been recorded in the connected device table TBL2.

When advancing to S2080, the controller 10 executes a main updating management process. Referring to FIG. 28B, the main updating management process executed in S2080 is similar to the process in S1650-S1750 of FIG. 24, except the "write destination USB device" in S1650-S1750 is replaced with "transfer destination USB device." Further, after executing the main updating management process, the controller 10 advances to S2120 of FIG. 28A.

Referring to FIGS. 28A and 28B, in the main updating management process executed in S2080 of FIG. 28A, the controller 10 determines in S2650 whether the transfer destination USB device set in S2060 of FIG. 28A is occupied by the terminal device 50 on the network NT. If the USB device 3 is occupied by the terminal device (S2650: YES), then in S2710 the controller 10 determines whether a prescribed time has elapsed since the last access time indicated in the connected device data for the transfer destination USB device 3.

If the prescribed time has elapsed since the last access time (S2710: YES) or if the transfer destination USB device is not occupied by the terminal device 50 on the network NT (S2650: NO), then the controller 10 executes the content updating process shown in FIG. 21. In the content updating process, the controller 10 acquires RSS data corresponding to the URL indicated in the content updating data for index number k from the server SV via the network NT and writes the content obtained from the RSS data to the transfer destination USB device (S1865 and S1895 of FIG. 21). The controller 10 also updates the content updating data for the index number k in the content updating data table TBL5 (S1900 of FIG. 21). After completing the process in S2080 of FIG. 28A, i.e., the process shown in FIG. 28B, the controller 10 advances to S2120.

Referring to FIG. 28A again, if the controller 10 determines in S2050 that the device ID is the value "−1" (S2050: YES), then in S2090 the controller 10 selects one of the music players 40 recorded in the connected device table TBL2 as the transfer destination USB device and subsequently executes the main updating management process in S2100.

The main updating management process executed in S2100 is essentially the same as that performed in S2080. Specifically, in S2100 the controller 10 executes the process in S2650-S2750 of FIG. 28B for the transfer destination USB device set in S2090. Accordingly, the controller 10 executes the content updating process of FIG. 28B when the transfer destination USB device is not occupied by the terminal device 50 on the network NT (S2650 of FIG. 28B: NO) or when the prescribed time has elapsed since the last access time indicated by the connected device data for the transfer destination USB device (S2710 of FIG. 28B: YES). In the content updating process, the controller 10 acquires RSS data corresponding to the URL indicating the content updating data for the index number k from the server SV via the network NT and writes the content obtained from the RSS data to the transfer destination USB device. The controller 10 also updates the content updating data for the index number k in the content updating data table TBL5.

After completing the process in S2100 (FIG. 28A), in S2110 the controller 10 determines whether all of the music players 40 recorded in the connected device table TBL2 have been selected as the transfer destination USB device in S2090. If the controller 10 determines that not all music players 40 have been selected as the transfer destination USB device (S2110: NO), then the controller 10 returns to S1090 to select another music player 40 that has not been previously selected as the transfer destination USB device, and repeats the main updating management process in S2100 for the new transfer destination USB device.

In this way, the controller 10 writes the same content to all music players 40 connected to the multifunction device 1 upon determining in S2050 that the device ID is "−1". After completing the main updating management process for each of the music players 40 connected to the multifunction device 1 (S2110: YES), the controller 10 advances to S2120. When repeating the main updating management process described above, the content initially acquired via the network may be temporarily stored so that the content may be written to each of the music players 40 without acquiring the content via the network each time.

After advancing to S2120, the controller 10 increments the reference number k by 1 and returns to S2020 to again determine whether the incremented reference number k is greater than the maximum number Ms. If the reference number k is greater than the maximum number Ms (S2020: YES), then the controller 10 advances to S2130. If the reference number k is less than or equal to the maximum number Ms (S2020: NO), then in S2030 the controller 10 reads the content updating data for the next index number k and executes the process beginning from S2040 on this content updating data.

Figure 29:
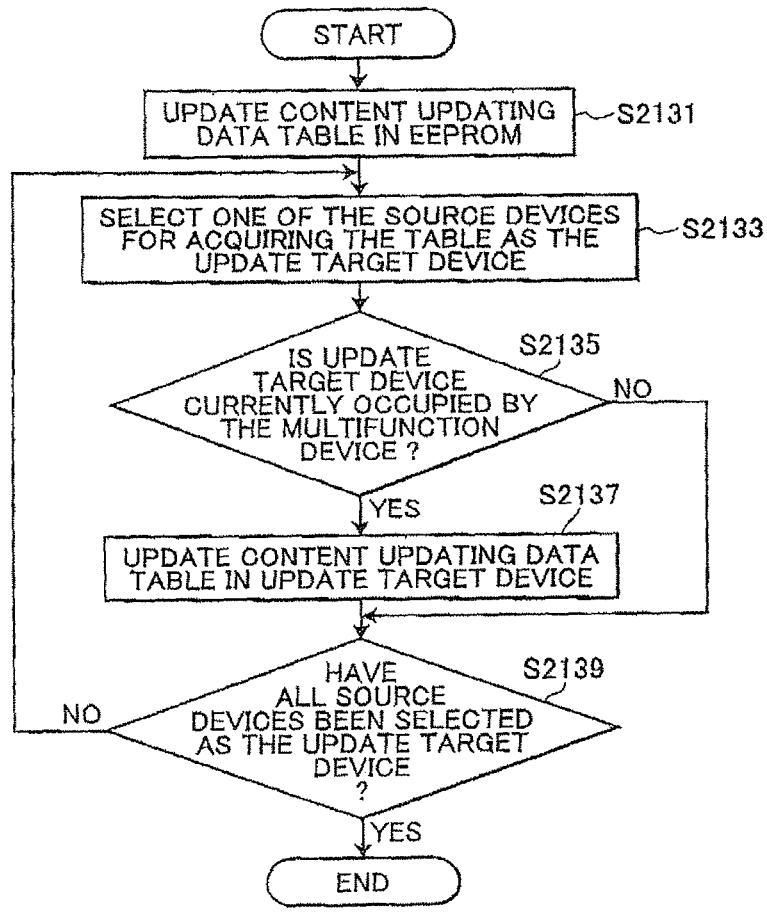
FIG. 29 is a flowchart illustrating table updating process.

However, when advancing to S2130, the controller 10 executes a table updating process shown in FIG. 29 to reflect changes in the content updating data table TBL5 updated in S2010-S2120 in the content updating data tables TBL4 of the music players 40 connected to the multifunction device 1 and the content updating table TBL3 stored in the EEPROM 17.

Specifically, in S2131 at the beginning of the table updating process, the controller 10 updates data in the content updating table TBL3 to match corresponding data in the content updating data table TBL5. That is, the controller 10 copies each content updating data entry in the content updating data table TBL5 having the value "−1" for the table acquisition source data to the corresponding content updating data in the content updating table TBL3.

In S2133 the controller 10 selects one of the USB devices serving as a table acquisition source as an update target USB device based on the table acquisition source data recorded in the content updating data table TBL5. In S2135 the controller 10 determines whether the update target USB device is occupied by the multifunction device 1 itself. Specifically, the controller 10 determines whether the internal control function has been activated for the update target USB device.

If the controller 10 determines that the update target USB device is occupied by the multifunction device 1 (S2135: YES), then in S2137 the controller 10 updates the content updating data table TBL4 stored in the storage unit 40a of the update target USB device based on the content updating data table TBL5 in the RAM 15.

In other words, the controller 10 updates the content updating data table TBL4 possessed by the update target USB device so that all data in the content updating data table TBL4 matches the corresponding data in the content updating data table TBL5, i.e. the set of content updating data having the device ID of the update target USB device as the table acquisition source data.

After completing the process in S2137, or if a NO determination was made in S2135, the controller 10 advances to S2139 and determines whether all USB device serving as table acquisition sources in the content updating data table TBL5 have been selected in S2133 as the update target USB device. If the controller 10 determines that not all USB devices have been selected as the update target USB device (S2139: NO), then the controller 10 returns to S2133, selects a table acquisition source USB device not yet selected as the update target USB device, and executes the subsequent processes on this newly selected update target USB device.

However, if the controller 10 determines in S2139 that all USB devices have been selected as the update target USB device (S2139: YES), then the controller 10 ends the table updating process. With the table updating process described above, the multifunction device 1 updates the content updating table TBL3 in the EEPROM 17 to match the data in the content updating data table TBL5, and updates the content updating data table TBL4 for each music player 40 incorporated in the content updating data table TBL5 to match the data in the content updating data table TBL5.

After completing the table updating process, the controller 10 temporarily ends the content updating management process. However, the controller 10 again executes the content updating management process from S2010 after a prescribed interval so that content can be periodically acquired from the network and written to the music players 40.

If a USB device 3 connected to the multifunction device 1 is removed from the USB port CN, the controller 10 executes the removal accepting process shown in FIG. 11 (S410, S420), and deletes all records having table acquisition source data that matches the device ID of the connected device (USB device 3) identified in S410 from the content updating data table TBL5 in the RAM 15. In this way, the multifunction device 1 prevents unnecessary data from remaining in the RAM 15.

As described above, each music player 40 stores the content updating data table TBL4. When the music player 40 is connected to the multifunction device 1, the multifunction device 1 reads the content updating data table TBL4 from the music player 40, acquires content from an external server SV based on the content updating data table TBL4, and writes the acquired content to the music player 40 that was the source of the table.

Therefore, if the user is away on business at an outside office or hotel with an available multifunction device 1, the user can download required content to a music player 40 that the user has brought along simply by connecting the music player 40 to the multifunction device 1. The user need not perform any complex settings or operations on the multifunction device 1 at the outside location. Hence, by popularizing the above multifunction devices 1, a user can acquire and enjoy content while moving around to various locations at which the multifunction devices 1 are provided.

In the above embodiment, all music players 40 can be set as USB devices targeted for writing content in the multifunction device 1 and can record content updating data, and the multifunction device 1 can write content to all of the music players 40 connected to the multifunction device 1. Hence, the owner of the multifunction device 1 can specify all music players 40 as write targets and can record content updating data describing URLs for distributing advertising content to users in order to promote through this content various products and services to unspecified users using the multifunction device 1.

Hence, the multifunction devices 1 can be provided in public places as a new information providing system that is profitable to both the owners of the multifunction devices 1 and the users.

While the invention has been described in detail with reference to a specific embodiment, it would be apparent to those skilled in the art that many modifications and variations may be made therein without departing from the spirit of the invention, the scope of which is defined by the attached claims. For example, the present invention was applied to a digital multifunction device, but the present invention may be applied to other communication devices.

Further, in the embodiment described above, an abstract of the content is printed for each ITEM element in which the distributed content is not audio or video content. However, abstracts of content may be combined for a group of ITEM elements and printed all at once for each RSS data.

Figure 30:
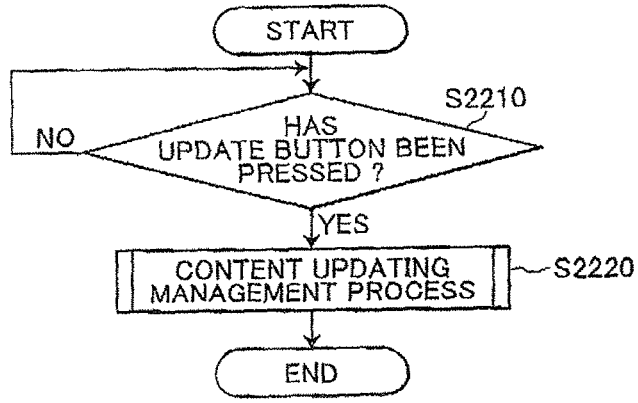
FIG. 30 is a flowchart illustrating a forced updating process.

Further, while the multifunction device 1 is configured to execute the content updating management process periodically, there may be cases in which the user wishes to update the content immediately. Therefore, a content update button may be provided in the operating unit 27 of the multifunction device 1, and the controller 10 may be configured to execute a forced updating process shown in FIG. 30. Specifically, the controller 10 determines whether the content update button has been pressed in S2210 of the process in FIG. 30 and immediately executes the content updating management process in S2220 when the content update button has been pressed (S2210: YES).

It is understood that the foregoing description and accompanying drawings set forth the embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A communication device, comprising:
   a processing unit;
   a network interface that communicates with a terminal device connected to a network;
   a communication interface that communicates with a locally connected peripheral device;
   an interface control unit that controls the communication interface and transmits control data to the peripheral device, the control data being for controlling the peripheral device;
   a device control unit that generates the control data for the peripheral device in accordance with an instruction entered from the processing unit, and transmits the control data to the interface control unit; and
   a relay unit that extracts the control data for the peripheral device from a packet received by the network interface, and transmits the control data to the interface control unit, and
   a mode switching unit that switches the device control unit and the relay unit to selectively activate an internal control mode and a network control mode, the internal control mode controlling the peripheral device by means of the device control unit, and the network control mode controlling the peripheral device by means of the relay unit.

2. The communication device according to claim 1, further comprises a storage unit that stores mode specification data indicating which the network control mode or the internal control mode should be activated, wherein the mode switching unit activates one of the network control mode and the internal control mode based on the mode specification data.

3. The communication device according to claim 2, wherein the peripheral device comprises a plurality of peripherals separated from each other, the storage unit stores the mode specification data for each of the plurality of peripherals, and the switching unit selectively activates one of the network control mode and the internal control mode for one of the plurality of peripherals based on the mode specification data.

4. The communication device according to claim 2, further comprising a notice unit that notices the terminal device of contents of the mode specification data through the network interface.

5. A method for controlling a communication device having a processing unit; a network interface for communicating with a terminal device connected to a network, the network interface receiving a packet from the terminal device; a communication interface for communicating with a locally connected peripheral device; and an interface control unit for controlling the communication interface and transmitting control data to the peripheral device, the control data being for controlling the peripheral device, comprising:

extracting control data from the packet and transmitting the extracted control data to the interface control unit as a network control mode controlling the peripheral device;

generating the control data according to an instruction entered from the processing unit and transmitting the generated control data to the interface control unit as an internal control mode controlling the peripheral device; and selectively activating the internal control mode and the network control mode.

6. A terminal device, comprising:

a main unit connected with a peripheral device;

a network interface provided in the main unit and connected to a network for communicating with another terminal device connected to the network, the network interface receiving a packet from the another terminal device; and a local interface provided in the main unit to communicate with the peripheral device, an interface control unit that controls the local interface to transmit control data to the peripheral device, the control data being for controlling the peripheral device;

an extraction unit that extracts the control data from the packet and transmits the extracted control data to the interface control unit as a network control mode;

a processing unit that issues an instruction for the peripheral device, generates the control data according to the instruction, and transmits the generated control data to the interface control unit as an internal control mode; and a mode switching unit that switches between the extraction unit and the processing unit to selectively activate the network control mode and the internal control mode.

7. The terminal device according to claim 6, further comprises a storage unit that stores mode specification data indicating which the network control mode or the internal control mode should be activated, wherein the mode switching unit activates one of the network control mode and the internal control mode based on the mode specification data.

8. The terminal device according to claim 7, further comprising a notice unit that notices the another terminal device of contents of the mode specification data through the network interface.

* * * * *